United States Patent
Akiike

(10) Patent No.: US 11,095,000 B2
(45) Date of Patent: Aug. 17, 2021

(54) SLURRY FOR LITHIUM ION SECONDARY BATTERY POROUS FILM, PRODUCTION METHOD THEREFOR, SEPARATOR FOR LITHIUM ION SECONDARY BATTERY, AND LITHIUM ION SECONDARY BATTERY

(71) Applicant: ZEON CORPORATION, Tokyo (JP)

(72) Inventor: Junnosuke Akiike, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 203 days.

(21) Appl. No.: 14/772,036

(22) PCT Filed: Mar. 19, 2014

(86) PCT No.: PCT/JP2014/057609
§ 371 (c)(1),
(2) Date: Sep. 1, 2015

(87) PCT Pub. No.: WO2014/148577
PCT Pub. Date: Sep. 25, 2014

(65) Prior Publication Data
US 2016/0013465 A1   Jan. 14, 2016

(30) Foreign Application Priority Data

Mar. 21, 2013 (JP) .............................. JP2013-058613

(51) Int. Cl.
| | |
|---|---|
| *H01M 50/411* | (2021.01) |
| *H01M 50/446* | (2021.01) |
| *H01M 50/449* | (2021.01) |
| *H01M 50/403* | (2021.01) |
| *C08L 33/00* | (2006.01) |
| *C08L 33/06* | (2006.01) |
| *C08F 220/10* | (2006.01) |
| *H01M 10/0525* | (2010.01) |

(52) U.S. Cl.
CPC .......... *H01M 50/449* (2021.01); *C08L 33/00* (2013.01); *H01M 50/403* (2021.01); *H01M 50/411* (2021.01); *H01M 50/446* (2021.01); *C08F 220/10* (2013.01); *C08L 33/06* (2013.01); *H01M 10/0525* (2013.01)

(58) Field of Classification Search
CPC .................................. H01M 2/14; H01M 2/16
See application file for complete search history.

(56) References Cited

U.S. PATENT DOCUMENTS

| | | | |
|---|---|---|---|
| 8,940,442 B2 | 1/2015 | Fukumine et al. | |
| 2006/0127753 A1 | 6/2006 | Nakashima et al. | |
| 2010/0173187 A1* | 7/2010 | Nishikawa ............ | H01M 2/145 429/129 |
| 2011/0091774 A1* | 4/2011 | Wakizaka .................. | C08J 5/18 429/246 |
| 2011/0165473 A1 | 7/2011 | Nakashima et al. | |
| 2012/0189898 A1* | 7/2012 | Wakizaka ............. | H01M 2/145 429/144 |
| 2013/0130123 A1* | 5/2013 | Kaneda ................... | H01M 4/64 429/233 |
| 2013/0266873 A1* | 10/2013 | Ishii ..................... | H01M 2/1686 429/246 |
| 2013/0330590 A1 | 12/2013 | Toyoda | |
| 2014/0147726 A1 | 5/2014 | Toyoda | |

FOREIGN PATENT DOCUMENTS

| | | | | |
|---|---|---|---|---|
| CN | 1860627 A | 11/2006 | | |
| CN | 102623658 A | 8/2012 | | |
| EP | 1667252 A1 | 6/2006 | | |
| EP | 2731170 A1 | 5/2014 | | |
| JP | 2005-071979 A | 3/2005 | | |
| JP | 2008-210541 A | 9/2008 | | |
| WO | 2009/096528 A1 | 8/2009 | | |
| WO | WO-2012020737 A1 * | 2/2012 | ............. | H01M 4/64 |
| WO | 2012/029805 A1 | 3/2012 | | |
| WO | 2012/043501 A1 | 4/2012 | | |
| WO | WO-2012057324 A1 * | 5/2012 | ............ | H01M 2/145 |
| WO | 2012/108245 A1 | 8/2012 | | |
| WO | 2012/115252 A1 | 8/2012 | | |
| WO | 2013/005796 A1 | 1/2013 | | |

OTHER PUBLICATIONS

Toyoda. WO 2012/029805. English translation. (Year: 2012).*
International Search Report and Written Opinion of the International Searching Authority; PCT/JP2014/057609; dated May 13, 2014.
The extended European search report issued by the European Patent Office on Aug. 12, 2016, which corresponds to European Patent Application No. 14768616.6-1373 and is related to U.S. Appl. No. 14/772,036.
Ishihara Sangyo Kaisha, Ltd.; "Functional Materials: High Purity Titanium Dioxide, CR-EL/PT Series"; 2011; pp. 1-4. [Online]:http://www.iskweb.co.jp/eng/products/functional06.html.
Communication pursuant to Article 94(3) EPC issued by the European Patent Office on Aug. 23, 2017, which corresponds to European Patent Application No. 14768616.6-1373 and is related to U.S. Appl. No. 14/772,036.
An Office Action issued by the Japanese Patent Office dated Apr. 24, 2018, which corresponds to Japanese Patent Application No. 2015-506838 and is related to U.S. Appl. No. 14/772,036 with an English translation.
Yuji Kawamura, High-purity titanium oxide, CR-EL-PT Series, Apr. 24, 2018, pp. 1-4, [Online]:www/iskweb.co.jp:80/products/functional06.htm.

\* cited by examiner

*Primary Examiner* — James Lee
(74) *Attorney, Agent, or Firm* — Studebaker & Brackett PC

(57) ABSTRACT

A slurry for a lithium ion secondary battery porous membrane, including non-conductive particles, a water-soluble polymer containing an acidic group-containing monomer unit, and a particulate polymer, wherein: an amount of the water-soluble polymer is 0.05 parts by weight to 2 parts by weight relative to 100 parts by weight of the non-conductive particles; and a BET specific surface area of the non-conductive particles is 5 $m^2/g$ to 10 $m^2/g$.

8 Claims, No Drawings

SLURRY FOR LITHIUM ION SECONDARY BATTERY POROUS FILM, PRODUCTION METHOD THEREFOR, SEPARATOR FOR LITHIUM ION SECONDARY BATTERY, AND LITHIUM ION SECONDARY BATTERY

FIELD

The present invention relates to a slurry for a lithium ion secondary battery porous membrane and a production method thereof, as well as a separator for a lithium ion secondary battery and a lithium ion secondary battery using the slurry.

BACKGROUND

Among practically used batteries, a lithium ion secondary battery exhibits high energy density and has been widely used particularly in small sized electronic devices. In addition to such small sized usage, the lithium ion secondary battery has been expected for expanding its usage in automobiles. In general, the lithium ion secondary battery includes a positive electrode and a negative electrode, as well as a separator and an electrolytic solution. The separator to be used usually includes an organic separator layer formed of a resin such as a stretched polyethylene resin.

In general, operation of a battery is accompanied with heat generation. As a result, the organic separator layer is also heated. In most of cases, the organic separator layer formed of the resin tends to cause shrinkage even at a temperature of 150° C. or lower, thereby easily causing short circuit of a battery. In order to prevent the short circuit caused by such heat generation, there has been proposed a separator that includes a porous membrane containing non-conductive particles such as an inorganic filler (Patent Literature 1).

CITATION LIST

Patent Literature

Patent Literature 1: International Publication 2009/096528

SUMMARY

Technical Problem

In recent years, levels of the requirements for the properties of the lithium ion secondary battery are becoming increasingly higher, and, e.g., a technique capable of improving high temperature cycle property of the lithium ion secondary battery is being demanded. Further, as for a separator, it is required to realize prevention of short circuit of the lithium ion secondary battery for the purpose of improving safety.

The present invention has been made in view of the aforementioned problems, and an object of the invention is to provide: a slurry for a lithium ion secondary battery porous membrane and a production method thereof that are capable of realizing a lithium ion secondary battery excellent in both high temperature cycle property and safety; a separator for a lithium ion secondary battery that is capable of realizing a lithium ion secondary battery excellent in both high temperature cycle property and safety; and a lithium ion secondary battery excellent in both high temperature cycle property and safety.

Solution to Problem

In order to solve the aforementioned problem, the present inventor has performed intensive studies. As a result, it has been found out that there can be obtained a lithium ion secondary battery excellent in both high temperature cycle property and safety by forming a porous membrane using a slurry that includes non-conductive particles, a water-soluble polymer having an acidic group-containing monomer unit, and a particulate polymer, wherein the amount of the water-soluble polymer is set within a predetermined range and a BET specific surface area of the non-conductive particles is set within a predetermined range, and thus the present invention has been completed.

Accordingly, the present invention is as follows.

(1) A slurry for a lithium ion secondary battery porous membrane, comprising non-conductive particles, a water-soluble polymer containing an acidic group-containing monomer unit, and a particulate polymer, wherein:

an amount of the water-soluble polymer is 0.05 parts by weight to 2 parts by weight relative to 100 parts by weight of the non-conductive particles; and a BET specific surface area of the non-conductive particles is 5 $m^2/g$ to 10 $m^2/g$.

(2) The slurry for a lithium ion secondary battery porous membrane according to {1}, wherein, in an accumulated particle size distribution of the non-conductive particles, a particle diameter D1 that is a cumulative volume of particle of 10% from a small diameter side, a particle diameter D50 that is a cumulative volume of particle of 50% from the small diameter side, and a particle diameter D90 that is a cumulative volume of particle of 90% from the small diameter side are as follows:

D10 is 0.2 μm to 0.4 μm;
D50 is 0.5 μm to 0.9 μm; and
D90 is 1.0 μm to 3.0 μm.

(3) The slurry for a lithium ion secondary battery porous membrane according to {1} or (2) having an iron ion concentration of 5 ppm to 500 ppm.

(4) The slurry for a lithium ion secondary battery porous membrane according to any one of (1) to (3), wherein the particulate polymer is a particulate acrylic polymer.

(5) The slurry for a lithium ion secondary battery porous membrane according to any one of (1) to (4) having a solid content concentration of 35% by weight to 50% by weight.

(6) A method for producing the slurry for a lithium ion secondary battery porous membrane according to any of (1) to (5), comprising the steps of:

mixing the non-conductive particles, the water-soluble polymer containing the acidic group-containing monomer unit, and water having an electrical conductivity of 0.5 μS/cm to 30 μS/cm to obtain a dispersion of the non-conductive particles having a solid content concentration of 40% by weight to 60% by weight;

dispersing the dispersion of the non-conductive particles under a condition of 2 Wh/kg to 8 Wh/kg; and mixing the dispersion of the non-conductive particles with the particulate polymer.

(7) A separator for a lithium ion secondary battery, comprising: an organic separator layer; and a porous membrane obtained by applying onto the organic separator layer the slurry for a lithium ion secondary battery porous membrane according to any one of (1) to (5) and drying the slurry.

(8) A lithium ion secondary battery comprising: a positive electrode, a negative electrode, the separator for a lithium ion secondary battery according to (7), and an electrolytic solution.

Advantageous Effects of Invention

With the slurry for a lithium ion secondary battery porous membrane of the present invention, there can be achieved a lithium ion secondary battery excellent in both high temperature cycle property and safety.

According to the production method for a slurry for a lithium ion secondary battery porous membrane of the present invention, there can be produced a slurry for a lithium ion secondary battery porous membrane, capable of achieving a lithium ion secondary battery excellent in both high temperature cycle property and safety.

According to the separator for a lithium ion secondary battery of the present invention, there can be achieved a lithium ion secondary battery excellent in both high temperature cycle property and safety.

The lithium ion secondary battery of the present invention is excellent in both high temperature cycle property and safety.

DESCRIPTION OF EMBODIMENTS

The present invention will be described hereinbelow in detail by way of embodiments and illustrations. However, the present invention is not limited to the following embodiments and illustrations and may be implemented with any optional modification without departing from the scope of claims and equivalents thereto.

In the following description, (meth)acrylic acid means acrylic acid or methacrylic acid. (Meth)acrylate means acrylate or methacrylate. Furthermore, (meth)acrylonitrile means acrylonitrile or methacrylonitrile.

In addition, a substance being water-soluble means that less than 1.0% by weight of the substance remains insoluble when 0.5 g of the substance is dissolved in 100 g of water at 25° C. On the other hand, a substance being water-insoluble means that not less than 90% by weight of the substance remains insoluble when 0.5 g of the substance is dissolved in 100 g of water at 25° C. If solubility of a substance in water varies depending on pH of the water, the substance is considered to be water soluble as long as there is a range of pH where the substance is water soluble.

Unless otherwise specified, in a polymer produced by copolymerizing a plurality of types of monomers, the ratio of a structural unit formed by polymerizing a given monomer in the polymer is usually the same as the ratio of the given monomer in the total monomers used for polymerization of the polymer (charging ratio).

[1. Overview of Porous Membrane Slurry]

The slurry for a lithium ion secondary battery porous membrane of the present invention (this may appropriately be referred to hereinbelow as "porous membrane slurry") includes non-conductive particles, a water-soluble polymer, and a particulate polymer. Further the porous membrane slurry usually includes a solvent. When the porous membrane slurry includes a solvent, the non-conductive particles and the particulate polymer are usually dispersed in the solvent and the water-soluble polymer is dissolved in the solvent.

[1.1. Non-Conductive Particles]

As the non-conductive particles, non-conductive particles having a BET specific surface area in the porous membrane slurry of usually 5 $m^2/g$ or more, and of usually 10 $m^2/g$ or less, preferably 9 $m^2/g$ or less, and more preferably 8 $m^2/g$ or less are used. By using the non-conductive particles having the BET specific surface area of not lower than the lower limit value of the aforementioned range, it becomes possible to fill the non-conductive particles densely, and thus mechanical strength of the porous membrane can be improved, and further heat resistance thereof can also be usually improved. As a result, safety of the lithium ion secondary battery can be improved. On the other hand, by using the non-conductive particles having the BET specific surface area of not higher than the upper limit value of the aforementioned range, electric properties such as the high temperature cycle property of the lithium ion secondary battery can be improved. As such, by confining the BET specific surface area of the non-conductive particles within the aforementioned range, it becomes possible to improve safety and battery properties such as high temperature cycle property of the lithium ion secondary battery well in balance.

The BET specific surface area of the non-conductive particles in the porous membrane slurry can be measured by a wet-type specific surface area measuring apparatus.

Although means for confining the BET specific surface area of the non-conductive particles within the aforementioned range is not limited, examples thereof may include appropriately adjusting the particle diameter, the particle shape, and the degree of aggregation of the non-conductive particles.

Further, the non-conductive particles in the porous membrane slurry have D10 of preferably 0.2 µm or more and more preferably 0.3 µm or more, and preferably 0.4 µm or less. The D10 herein represents a diameter of the particle at the cumulative volume of 10% from the small diameter side in an accumulated particle size distribution of the non-conductive particles. By adjusting the D10 of the non-conductive particles to the lower limit value or more of the aforementioned range, the amount of the non-conductive particles having extremely small sizes can be reduced, and battery properties such as high temperature cycle property can thereby be improved. On the other hand, by adjusting it to the upper limit value or less, the amount of the non-conductive particles having extremely large sizes can be reduced, and mechanical strength of the porous membrane can thereby be improved. Further, heat resistance can usually be improved as well.

Further, the non-conductive particles in the porous membrane slurry have D50 of preferably 0.5 µm or more and more preferably 0.7 µm or more, and preferably 0.9 µm or less. The D50 herein represents a diameter of the particle at the cumulative volume of 50% from the small diameter side in the accumulated particle size distribution of the non-conductive particles. By adjusting the D50 of the non-conductive particles to the lower limit value or more of the aforementioned range, the amount of the non-conductive particles having extremely small sizes can be reduced, and battery properties such as high temperature cycle property can thereby be improved. On the other hand, by adjusting it to the upper limit value or less, the amount of the non-conductive particles having extremely large sizes can be reduced, and mechanical strength of the porous membrane can thereby be improved. Further, heat resistance can usually be improved as well.

Further, the non-conductive particles in the porous membrane slurry have D90 of preferably 1.0 µm or more and more preferably 1.2 µm or more, and preferably 3.0 µm or less, more preferably 2.0 µm or less, and further preferably 1.5 µm or less. The D90 herein represents a diameter of the particle at the cumulative volume of 90% from the small diameter side in the accumulated particle size distribution of the non-conductive particles. By adjusting the D90 of the non-conductive particles to the lower limit value or more of the aforementioned range, the amount of the non-conductive particles having extremely small sizes can be reduced, and battery properties such as high temperature cycle property can thereby be improved. On the other hand, by adjusting it to the upper limit value or less, the amount of the non-conductive particles having extremely large sizes can be reduced, and mechanical strength of the porous membrane can thereby be improved. Further, heat resistance can usually be improved as well.

It is not exactly known why such a reduction in the amount of the particles having extremely small sizes can improve the battery properties. However, according to the studies of the present inventor, the reason can be speculated as follows. Specifically, by reducing the amount of the particles having extremely small sizes, resistance against the passage of ions through the porous membrane can be reduced. Further, by reducing the amount of the particles having extremely small sizes, surface area of the porous membrane including the particles can be reduced, and the water content adsorbed by the surface of the porous membrane can also be reduced. This water can be decomposed by charging and discharging to produce hydrogen, resulting in corrosion of electrodes and an increase in the resistance, and thus by reducing the amount of the particles having extremely small sizes, electric properties of the lithium ion secondary battery, especially those at high temperatures, can be improved. That is speculated to be the reason why the battery property can be improved by reducing the amount of the particles having extremely small sizes.

Similarly, it is not exactly known why such a reduction in the amount of the particles having extremely large sizes can improve mechanical strength and heat resistance of the porous membrane. However, according to the studies of the present inventor, the reason can be speculated as follows. Specifically, by reducing the amount of the particles having extremely large sizes, the non-conductive particles can be densely filled in the porous membrane. The non-conductive particles usually has excellent mechanical strength, heat resistance, and electrical insulation, and thus it is considered that the mechanical strength and the heat resistance of the porous membrane would be improved as described above if dense filling of the non-conductive particles is achieved. That is speculated to be the reason why reduction in the amount of the particles having extremely large sizes results in enhancement in mechanical strength of the porous membrane with which heat resistance can usually be improved as well.

The D10, D50, and D90 of the non-conductive particles in the porous membrane slurry may be obtained by measuring the accumulated particle size distribution of the non-conductive particles. Further, the accumulated particle size distribution of the non-conductive particles in the porous membrane may be measured by a laser diffraction method.

Although means for confining the D10, D50, and D90 of the non-conductive particles within the aforementioned ranges is not limited, examples thereof may include appropriately adjusting the particle diameter, the particle shape, and the degree of aggregation of the non-conductive particles. It is also possible to confine the D10, D50, and D90 within the aforementioned ranges by classifying any non-conductive particles including, e.g., commercially available ones.

As such non-conductive particles, any of inorganic particles and organic particles may be used.

Inorganic particles have excellent dispersion stability in solvents, and thus have low tendency to precipitate in the porous membrane slurry. Therefore the inorganic particles can maintain uniform slurry state for a long period of time. Further, use of inorganic particles can usually increase heat resistance of the porous membrane effectively. As the materials of the non-conductive particles, electrochemically stable materials are preferable. From such a viewpoint, preferable examples of inorganic materials of the non-conductive particles may include particles of oxides such as aluminum oxide (alumina), aluminum oxide hydrates (boehmite (AlOOH), aluminum hydroxide (Al(OH)$_3$)), silicon oxide, magnesium oxide (magnesia), magnesium hydroxide, calcium oxide, titanium oxide (titania), BaTiO$_3$, ZrO, and an alumina-silica complex oxide; particles of nitrides such as aluminum nitride and boron nitride; particles of covalent crystals such as silicon and diamond; crystal particles of insoluble ions such as barium sulfate, calcium fluoride, and barium fluoride; and particles of clays such as talc and montmorillonite. Of these, particles of oxides are preferable from the viewpoint of stability in an electrolytic solution and electropotential stability. In particular, barium sulfate, titanium oxide, aluminum oxide, aluminum oxide hydrate, magnesium oxide, and magnesium hydroxide are more preferable from the viewpoint of low water absorption and excellent heat resistance (for example, resistance to high temperature of 180° C. or more); barium sulfate, aluminum oxide, aluminum oxide hydrate, magnesium oxide, and magnesium hydroxide are still more preferable; and barium sulfate and aluminum oxide are particularly preferable.

As the organic particles, polymer particles are usually used. The affinity of the organic particles to water can be controlled by adjusting the type and amount of a functional group(s) on the surface of the organic particles, thus to control the water content in the porous membrane. The organic particles usually have an advantage of small amount of metal ion elution. Preferable examples of organic materials of the non-conductive particles may include a variety of polymers such as polystyrene, polyethylene, polyimide, melamine resin, and phenol resin. The polymers forming the particles may be used even in a form of, e.g., mixtures, modified bodies, derivatives, random copolymers, alternating copolymers, graft copolymers, block copolymers, and crosslinked forms. The organic particles may be formed by a mixture of two or more polymers.

When the organic particles are used as the non-conductive particles, the organic particles need not have a glass transition temperature. When the polymer forming the organic particles has a glass transition temperature, the glass transition temperature is preferably 150° C. or higher, more preferably 200° C. or higher, and particularly preferably 250° C. or higher, and is usually 500° C. or lower.

The non-conductive particles may be optionally subjected to, e.g., element substitution, surface treatment, and solid solution formation. A single non-conductive particle may contain one of the aforementioned materials solely or may contain two or more of the aforementioned materials in combination at any ratio. In addition, the non-conductive particles may be used in combination of two or more types of particles made of different materials. Therefore, the inorganic particles and the organic particles may be used in combination as non-conductive particles. However, it is particularly preferable to use the inorganic particles.

The aspect ratio of the non-conductive particles is usually 1 or more, and is preferably 5 or less and more preferably 3 or less. By confining the aspect ratio of the non-conductive particles within the aforementioned range, it becomes possible to form pores uniformly in the porous membrane, and degradation of the battery can be suppressed.

Examples of the shape of the non-conductive particles may include a spherical shape, an oval spherical shape, and a polygonal shape. Among them, for the purpose of confining the BET specific surface area of the non-conductive particles within the aforementioned range, the polygonal shape is preferable.

It is preferable that the amount of the non-conductive particles is set so as to confine the amount of the non-conductive particles in the porous membrane within a predetermined range. The specific range of the amount of the non-conductive particles in the porous membrane is preferably 86% by weight or more, more preferably 88% by weight or more, and particularly preferably 90% by weight or more, and is preferably 99% by weight or less, more preferably 97% by weight or less, and particularly preferably 95% by weight or less. By adjusting the amount of the non-conductive particles in the porous membrane to the lower limit value or more of the aforementioned range, heat resistance of the porous membrane can be effectively improved.

[1.2. Water-Soluble Polymer]

As the water-soluble polymer, a water-soluble polymer having an acidic group-containing monomer unit is used. The acidic group-containing monomer unit herein refers to a structural unit having a structure formed by polymerizing an acidic group-containing monomer. Further, the acidic group-containing monomer refers to a monomer having an acidic group.

Regarding the water-soluble polymer having the acidic group-containing monomer unit, the water-soluble polymer itself also includes an acidic group. By the action of the acidic group, dispersibility of the non-conductive particles in the porous membrane slurry can be improved. It is not exactly known why such advantage is attained. However, according to the studies of the present inventor, the reason can be speculated as follows. In general, the D10, D50, and D90 of the non-conductive particles before the porous membrane slurry is prepared are different from those of the non-conductive particles contained in the porous membrane slurry. This appears to be because the non-conductive particles tend to aggregate in the porous membrane slurry. On the other hand, in the porous membrane slurry of the present invention, the water-soluble polymers can be adsorbed on the surface of the non-conductive particles. That is speculated to be the reason why the dispersibility of the non-conductive particles in the porous membrane slurry can be improved, and in turn the dispersibility of the non-conductive particles in the porous membrane can be improved. Specifically, when the porous membrane slurry includes an aqueous solvent such as water, the water-soluble polymer is dissolved in the aqueous solvent in the porous membrane slurry. In this process, part of the water-soluble polymer is liberated into the aqueous solvent, however another part is adsorbed on the surface of the non-conductive particles, so that the surface of the non-conductive particles is covered with a stable layer of the water-soluble polymer. It is speculated that, by the action of this stable layer, the dispersibility of the non-conductive particles can be improved.

In the porous membrane slurry of the present invention, the non-conductive particles exhibit excellent dispersibility in such a manner, and thereby aggregation of the non-conductive particles can be prevented. Thus it is possible to easily confine the BET specific surface area, and the D10, D50 and D90 of the non-conductive particles in the porous membrane slurry within the aforementioned preferable ranges. Further, since the aggregation of the non-conductive particles can be prevented, the porous membrane and an organic separator layer are prevented from being damaged by large particles that would be generated by the aggregation. Consequently, safety of the lithium ion secondary battery can be improved by preventing occurrence of the short circuit.

Examples of the acidic group may include —COOH group (carboxylic acid group); —SO$_3$H group (sulfonic acid group); and phosphoric acid groups such as —PO$_3$H$_2$ group and —PO(OH)(OR) group (R represents a hydrocarbon group). Accordingly, examples of the acidic group-containing monomer may include a monomer having such an acidic group. Examples of the acidic group-containing monomer may further include monomers capable of generating the aforementioned acidic group by hydrolysis. Specific examples of such an acidic group-containing monomer may include an acid anhydride capable of generating a carboxylic acid group by hydrolysis.

Examples of the monomer having a carboxylic acid group may include monocarboxylic acids, dicarboxylic acids, anhydrides of dicarboxylic acids, and derivatives thereof. Examples of the monocarboxylic acids may include acrylic acid, methacrylic acid, crotonic acid, 2-ethylacrylic acid, and isocrotonic acid. Examples of the dicarboxylic acids may include maleic acid, fumaric acid, itaconic acid, and methyl maleic acid. Examples of the anhydrides of dicarboxylic acids may include maleic anhydride, acrylic anhydride, methyl maleic anhydride, and dimethyl maleic anhydride. Among them, the monocarboxylic acids are preferable, and acrylic acid and methacrylic acid are more preferable.

Examples of the monomer having a sulfonic acid group may include vinylsulfonic acid, methyl vinylsulfonic acid, (meth)allylsulfonic acid, styrenesulfonic acid, (meth)acrylic acid-2-ethyl sulfonate, 2-acrylamide-2-methylpropanesulfonic acid, 3-allyloxy-2-hydroxypropanesulfonic acid, and 2-(N-acryloyl)amino-2-methyl-1,3-propane-disulfonic acid. Among them, 2-acrylamide-2-methylpropanesulfonic acid is preferable.

Examples of the monomer having a phosphoric acid group such as —PO$_{31}$-12 group and —PO(OH)(OR) group (R represents a hydrocarbon group) include 2-(meth)acryloyloxyethyl phosphate, methyl 2-(meth)acryloyloxyethyl phosphate, and ethyl (meth)acryloyloxyethyl phosphate.

In addition, salts of the aforementioned monomers may also be used as the acidic group-containing monomer.

Among the aforementioned acidic group-containing monomers, the monomer having a carboxylic acid group and the monomer having a sulfonic acid group are preferable. By using them, adsorption of the water-soluble polymer on the non-conductive particles is effectively improved, and thus the dispersibility of the non-conductive particles can be further improved.

As the acidic group-containing monomers, one type thereof may be solely used, and two or more types thereof may also be used in combination at any ratio. For example, different types of monomers including the same type of acidic group may be used in combination. Alternatively, for example, the monomers including different types of acidic groups may be used in combination. Among them, it is particularly preferable to use the monomer having a sulfonic acid group and the monomer having a carboxylic acid group in combination since the dispersibility of the non-conductive particles can thereby be effectively improved.

When the monomer having a sulfonic acid group and the monomer having a carboxylic acid group are used in combination, the weight ratio represented by "monomer having a sulfonic acid group/monomer having a carboxylic acid group" is preferably 1/999 or more and more preferably 0.01 or more, and is preferably 1 or less, more preferably 0.5 or less, and particularly preferably 0.3 or less. Therefore, it is preferable that the weight ratio between the structural unit having a sulfonic acid group and the structural unit having a carboxylic acid group in the water-soluble polymer is confined within the aforementioned range. By adjusting the weight ratio to the lower limit value or more of the aforementioned range, an increase in viscosity caused by the aggregation of the water-soluble polymer can be suppressed, and stability of the non-conductive particles can thereby be improved. On the other hand, by adjusting it to the upper limit value or less, the adsorption of the water-soluble polymer onto the non-conductive particles can be improved, and dispersibility of the non-conductive particles can thereby be improved.

Further, the water-soluble polymer may include optional structural units other than the acidic group-containing monomer unit. Examples of monomers constituting the optional structural units may include (meth)acrylic acid alkyl esters such as methyl(meth)acrylate, ethyl(meth)acrylate, butyl (meth)acrylate, and 2-ethylhexyl(meth)acrylate; α,β-unsaturated nitrile compounds such as acrylonitrile and methacrylonitrile; hydroxyalkyl acrylates such as 2-hydroxyethyl acrylate, 2-hydroxyethyl methacrylate, and 2-hydroxypropyl acrylate; monoallylethers of allyl alcohols and polyhydric alcohols; and hydroxyl group-containing monomers such as vinyl alcohols. Even when the water-soluble polymer includes the optional structural units, the ratio of the acidic group-containing monomer unit in the water-soluble polymer is preferably 40% by weight or more, more preferably 60% by weight or more, and particularly preferably 80% by weight or more, and is usually 100% by weight or less.

As the water-soluble polymer, one type thereof may be solely used, and two or more types thereof may also be used in combination at any ratio.

The weight average molecular weight of the water-soluble polymer is preferably 1,000 or more and more preferably 1,500 or more, and is preferably 15,000 or less and more preferably 10,000 or less. By adjusting the weight average molecular weight of the water-soluble polymer to the lower limit value or more of the aforementioned range, the adsorption of the water-soluble polymer onto the non-conductive particles can be improved, and dispersibility of the non-conductive particles can thereby be improved. On the other hand, by adjusting it to the upper limit value or less, viscosity increase caused by the aggregation of the water-soluble polymer can be suppressed, and stability of the non-conductive particles can thereby be improved.

The weight average molecular weight of the water-soluble polymer herein can be measured as a value in terms of polystyrene by a gel permeation chromatography (GPC) using N,N-dimethylformamide (DMF) as a developing solvent.

The method for producing the water-soluble polymer having the acidic group-containing monomer unit is not particularly limited and any methods such as a solution polymerization method, a suspension polymerization method, and an emulsion polymerization method may be used. Among them, the emulsion polymerization method and the suspension polymerization method are preferable since these methods allow polymerization in water and the resulting product as it is can be used as materials for the porous membrane slurry. When the water-soluble polymer is produced, the reaction system preferably includes a dispersant. Specifically, the water-soluble polymer can be produced by performing addition polymerization of a monomer composition having the acidic group-containing monomer and, if necessary, the monomers constituting the optional structural units in an aqueous solvent.

By performing the addition polymerization reaction in the aqueous solvent in this manner, an aqueous dispersion containing in the aqueous solvent the water-soluble polymer having the acidic group-containing monomer unit can be obtained. From the aqueous dispersion thus obtained, the water-soluble polymer may be isolated for use. Alternatively, the dispersion as it is may be used for preparing the porous membrane slurry.

The aqueous dispersion containing in the aqueous solvent the water-soluble polymer having the acidic group-containing monomer unit is usually acidic. Thus the dispersion may be alkalized to pH 7 to pH 13, if necessary. This alkalization can improve handling property of the solution and can also improve coating property of the porous membrane slurry. Examples of methods for alkalizing to pH 7 to pH 13 may include a method of mixing the dispersion with an alkaline aqueous solution that includes: an alkali metal aqueous solution such as a lithium hydroxide aqueous solution, a sodium hydroxide aqueous solution, and a potassium hydroxide aqueous solution; an alkaline earth metal aqueous solution such as a calcium hydroxide aqueous solution and a magnesium hydroxide aqueous solution; and an aqueous ammonia solution. As the alkaline aqueous solution, one type thereof may be solely used, and two or more types thereof may also be used in combination at any ratio.

The amount of the water-soluble polymer is usually 0.05 parts by weight or more and preferably 0.1 parts by weight or more, and is usually 2 parts by weight or less, preferably 1 part by weight or less, and more preferably 0.8 parts by weight or less, relative to 100 parts by weight of the non-conductive particles. By adjusting the amount of the water-soluble polymer to the lower limit value or more of the aforementioned range, the adsorption of the water-soluble polymers onto the non-conductive particles can be improved, and dispersibility of the non-conductive particles can be improved. On the other hand, by adjusting it to the upper limit value or less, viscosity increase caused by the aggregation of the water-soluble polymers can be suppressed, and stability of the non-conductive particles can be improved.

[1.3. Particulate Polymer]

The particulate polymer is usually dispersed in a particulate form in the porous membrane slurry. Thus, when the porous membrane slurry contains an aqueous solvent such as water as a solvent, the particulate polymer is usually a water-insoluble polymer. Further, the particulate polymer can function as a binder in the porous membrane. Thus, the particulate polymer in the porous membrane usually exerts a function of binding the non-conductive particles with each other, and also a function of binding the non-conductive particles with an organic separator layer.

Preferable examples of the particulate polymer may include a styrene-butadiene copolymer (SBR), an acrylonitrile-butadiene copolymer (NBR), a hydrogenated SBR, a hydrogenated NBR, a styrene-isoprene-styrene block copolymer (SIS), and an acrylic polymer. Among them, the acrylic polymer is more preferable since it can be used in the porous membrane both on the positive and negative electrode sides and is excellent in versatility. That is, the particulate polymer is preferably a particulate acrylic polymer.

The acrylic polymer refers to a polymer including a (meth)acrylic acid ester monomer unit. The (meth)acrylic acid ester monomer unit herein refers to a structural unit having a structure formed by polymerizing a (meth)acrylic acid ester monomer. Examples of the (meth)acrylic acid ester monomer may include compounds represented by $CH_2=CR^2-COOR^3$. In this formula, $R^2$ represents a hydrogen atom or a methyl group and $R^3$ represents an alkyl group or a cycloalkyl group. By using the particulate polymer including the (meth)acrylic acid ester monomer unit, flexibility of the porous membrane can be improved. Further, swelling of the porous membrane in an electrolytic solution can be reduced.

Examples of the (meth)acrylic acid ester monomer may include: acrylates such as methyl acrylate, ethyl acrylate, n-propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, 2-methoxyethyl acrylate, 2-ethoxyethyl acrylate, hexyl acrylate, nonyl acrylate, lauryl acrylate, stearyl acrylate, and benzyl acrylate; and methacrylates such as methyl methacrylate, ethyl methacrylate, propyl methacrylate, isopropyl methacrylate, n-butyl methacrylate, isobutyl methacrylate, t-butyl methacrylate, n-amyl methacrylate, isoamyl methacrylate, n-hexyl methacrylate, 2-ethylhexyl methacrylate, octyl methacrylate, isodecyl methacrylate, lauryl methacrylate, tridecyl methacrylate, stearyl methacrylate, and benzyl methacrylate. Among them, acrylates are preferable and n-butyl acrylate and 2-ethylhexyl acrylate are particularly preferable since strength of the porous membrane can therewith be improved. One type of them may be solely used, and two or more types thereof may also be used in combination at any ratio.

The ratio of the (meth)acrylic acid ester monomer unit in the acrylic polymer is preferably 35% by weight or more and more preferably 45% by weight or more, and is preferably 99% by weight or less and more preferably 98% by weight or less. By adjusting the ratio of the (meth)acrylic acid ester monomer unit to the lower limit value or more of the aforementioned range, flexibility of the porous membrane can be improved. This reduces the possibility of causing cracking on the porous membrane when the porous membrane is pressurized in manufacturing process of the lithium ion secondary battery. On the other hand, by adjusting it to the upper limit value or less, dispersibility of the porous membrane slurry can be improved.

The acrylic polymer preferably includes a nitrile group-containing monomer unit. The nitrile group-containing monomer unit herein refers to a structural unit having a structure formed by polymerizing a monomer containing a nitrile group. The acrylic polymer including the (meth) acrylic acid ester monomer unit and the nitrile group-containing monomer unit in combination is stable against an oxidation-reduction reaction, and thus a battery having a long service life can be easily obtained.

Examples of the nitrile group-containing monomer may include acrylonitrile, methacrylonitrile, fumaronitrile, α-chloroacrylonitrile, and α-cyanoethylacrylonitrile. Among them, acrylonitrile is preferable since it can effectively enhance binding capability of the acrylic polymer. As the nitrile group-containing monomer, one type thereof may be solely used, and two or more types thereof may also be used in combination at any ratio.

The ratio of the nitrile group-containing monomer unit in the acrylic polymer is preferably 1% by weight or more and more preferably 2% by weight or more, and is preferably 30% by weight or less and more preferably 25% by weight or less. By adjusting the ratio of the nitrile group-containing monomer unit to the lower limit value or more of the aforementioned range, strength of the acrylic polymer can be improved and tendency of causing removal of the porous membrane from the organic separator layer can be reduced, and thus it becomes possible to improve high temperature cycle property of the lithium ion secondary battery by preventing an increase in the distance between electrodes due to the removal of the porous membrane. On the other hand, by adjusting it to the upper limit value or less, the acrylic polymer can be suppressed from being polarized and swelling of the porous membrane in the electrolytic solution can be reduced, and thus it becomes possible to reduce tendency to cause removal of the porous membrane from the organic separator layer.

The acrylic polymer may include an ethylenically unsaturated acid monomer unit. The ethylenically unsaturated acid monomer unit refers to a structural unit having a structure formed by polymerizing an ethylenically unsaturated acid monomer. Further, the ethylenically unsaturated acid monomer refers to a monomer having an ethylenically unsaturated bond as well as an acidic group. By having the ethylenically unsaturated acid monomer unit in the acrylic polymer, slurry properties of the porous membrane slurry can be improved. This makes it possible to produce a porous membrane having excellent dispersibility of components such as the non-conductive particles and the particulate polymer, and thus a lithium ion secondary battery having low resistance can be obtained.

Examples of the ethylenically unsaturated acid monomer may include the same examples as those of the acidic group-containing monomer mentioned in the aforementioned section describing the water-soluble polymer. Among them, a monomer having a carboxylic acid, a monomer having a sulfonic acid group, and a monomer having a phosphoric acid group are preferable, and the monomer having a carboxylic acid and the monomer having a sulfonic acid group are more preferable. These monomers can effectively improve slurry properties of the porous membrane slurry. As the ethylenically unsaturated acid monomer unit, one type thereof may be solely used, and two or more types thereof may also be used in combination at any ratio.

The ratio of the ethylenically unsaturated acid monomer unit in the acrylic polymer is preferably 0.5% by weight or more and more preferably 1% by weight or more, and is preferably 10% by weight or less and more preferably 5% by weight or less. By adjusting the ratio of the ethylenically unsaturated acid monomer unit to the lower limit value or more of the aforementioned range, swelling of the acrylic polymer in the electrolytic solution can be reduced, and thereby tendency of causing removal of the porous membrane from the organic separator layer can be reduced. On the other hand, by adjusting it to the upper limit value or less, flexibility of the porous membrane can be improved, which in turn reduces possibility of causing cracking on the porous membrane when the porous membrane is pressurized in manufacturing process of the lithium ion secondary battery.

The acrylic polymer may include a crosslinkable monomer unit. The crosslinkable monomer unit herein refers to a structural unit having a structure formed by polymerizing a crosslinkable monomer. Further, the crosslinkable monomer refers to a monomer capable of forming a cross-linking structure by heating or energy ray irradiation during or after polymerization. By having the crosslinkable monomer unit in the acrylic polymer, mechanical strength of the acrylic polymer can be improved and swelling of the acrylic polymer in the electrolytic solution can be reduced.

Examples of the crosslinkable monomer may include a thermal crosslinkable monomer. Specific examples thereof may include: a monofunctional crosslinkable monomer having one olefinic double bond per molecule and the thermal crosslinkable group; and a polyfunctional crosslinkable monomer having two or more olefinic double bonds per molecule.

Examples of the thermal crosslinkable group may include an epoxy group, an N-methylolamide group, an oxetanyl group, an oxazoline group, and combinations thereof. Among them, an epoxy group is more preferable since therewith crosslinking and crosslinking density are easily adjustable. One type of them may be solely used, and two or more types thereof may also be used in combination at any ratio.

Examples of the crosslinkable monomer containing the epoxy group as the thermal crosslinkable group and the olefinic double bond may include: unsaturated glycidyl ethers such as vinylglycidyl ether, allylglycidyl ether, butenylglycidyl ether, and o-allylphenylglycidyl ether; monoepoxides of dienes or polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of the crosslinkable monomer containing an N-methylolamide group as the thermal crosslinkable group and the olefinic double bond may include (meth)acrylamides having a methylol group such as N-methylol(meth)acrylamide.

Examples of the crosslinkable monomer having an oxetanyl group as the thermal crosslinkable group and the olefinic double bond may include 3-((meth)acryloyloxymethyl) oxetane, 3-((meth)acryloyloxymethyl)-2-trifluoromethyl oxetane, 3-((meth)acryloyloxymethyl)-2-phenyl oxetane, 2-((meth)acryloyloxymethyl) oxetane, and 2-((meth)acryloyloxymethyl)-4-trifluoromethyl oxetane.

Examples of the crosslinkable monomer containing an oxazoline group as the thermal crosslinkable group and the olefinic double bond may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of the crosslinkable monomer containing two or more olefinic double bonds per molecule may include allyl(meth)acrylate, ethylene di(meth)acrylate, diethylene glycol di(meth)acrylate, triethylene glycol di(meth)acrylate, tetraethylene glycol di(meth)acrylate, trimethylolpropanetri(meth)acrylate, dipropylene glycol diallyl ether, polyglycol diallyl ether, triethylene glycol divinyl ether, hydroquinone diallyl ether, tetraallyloxyethane, trimethylolpropane-diallyl ether, allyl or vinyl ether of polyfunctional alcohols other than the foregoing, triallylamine, methylenebisacrylamide, and divinylbenzene.

Among them, as the crosslinkable monomer, N-methylol acrylamide, allyl methacrylate, ethylene dimethacrylate, allylglycidyl ether, and glycidyl methacrylate are particularly preferable.

As the crosslinkable monomer, one type thereof may be solely used, and two or more types thereof may also be used in combination at any ratio.

The ratio of the crosslinkable monomer unit in the acrylic polymer is preferably 0.5% by weight or more, more preferably 0.7% by weight or more, and particularly preferably 1% by weight or more, and is preferably 10% by weight or less, more preferably 8% by weight or less, and particularly preferably 6% by weight or less. By adjusting the ratio of the crosslinkable monomer unit to the lower limit value or more of the aforementioned range, mechanical strength of the acrylic polymer can be improved and swelling of the acrylic polymer in the electrolytic solution can be reduced. On the other hand, by adjusting it to the upper limit value or less, the acrylic polymer can be flexible, and thus binding property thereof can be improved.

The acrylic polymer may contain optional structural units other than the aforementioned structural units. Examples of monomers corresponding to the optional structural units may include an aromatic vinyl monomer and an ethylenically unsaturated carboxylic acid amide monomer. By using them, slurry properties of the porous membrane slurry can be improved, thus making it possible to produce a porous membrane having excellent dispersibility of the components such as the non-conductive particles and the particulate polymer, and to obtain a lithium ion secondary battery having low resistance.

Examples of the aromatic vinyl monomer may include styrene, α-methylstyrene, vinyltoluene, chlorostyrene, and hydroxymethylstyrene. Further, examples of the ethylenically unsaturated carboxylic acid amide monomer may include (meth)acrylamide and N-methoxymethyl(meth)acrylamide. One type of them may be solely used, and two or more types thereof may also be used in combination at any ratio. Further, the ratio of the optional structural units in the acrylic polymer is preferably 10% by weight or less, more preferably 8% by weight or less, and particularly preferably 5% by weight or less.

As the particulate polymer, one type thereof may be solely used, and two or more types thereof may also be used in combination at any ratio.

The weight average molecular weight of the particulate polymer is preferably 10,000 or more and more preferably 20,000 or more, and is preferably 1,000,000 or less and more preferably 500,000 or less. When the weight average molecular weight of the particulate polymer falls within the aforementioned range, strength of the porous membrane and dispersibility of the non-conductive particles can be easily improved. The weight average molecular weight of the particulate polymer herein may be measured as a value in terms of polystyrene by a gel permeation chromatography (GPC) using tetrahydrofuran as a developing solvent.

The glass transition temperature of the particulate polymer is preferably −60° C. or higher, more preferably −55° C. or higher, and particularly preferably −50° C. or higher, and is preferably 20° C. or lower, more preferably 15° C. or lower, and particularly preferably 5° C. or lower. By adjusting the glass transition temperature of the particulate polymer to the lower limit value or more of the aforementioned range, strength of the particulate polymer can be improved, and thereby strength of the porous membrane can be improved. On the other hand, by adjusting it to the upper limit value or less, flexibility of the porous membrane can be improved.

As described above, the particulate polymer can function as a binder in the porous membrane. Further, since the particulate polymer is formed in a particulate shape, the particulate polymer can be bound to the non-conductive particles not through a face contact but through a point contact. Thereby the space between the non-conductive particles in the porous membrane can be made large, and thus the porosity of the porous membrane can be large. That in turn facilitate passage of ions through the porous membrane, and resistance of the lithium ion secondary battery can thereby be reduced.

The volume average particle diameter of the particulate polymer in the porous membrane slurry is preferably 50 nm or larger and more preferably 70 nm or larger, and is preferably 500 nm or smaller and more preferably 400 nm or smaller. By confining the volume average particle diameter of the particulate polymer within the aforementioned range, the porous membrane having excellent strength and flexibility can be obtained. The volume average particle diameter herein refers to a diameter of the particle at the cumulative volume of 50% from the small diameter side in an accumulated particle size distribution.

The amount of the particulate polymer is preferably 0.1 parts by weight or more, preferably 0.5 parts by weight or more, and particularly preferably 1 part by weight or more, and is preferably 10 parts by weight or less, preferably 8 parts by weight or less, and particularly preferably 6 parts by weight or less, relative to 100 parts by weight of the non-conductive particles. By adjusting the amount of the particulate polymer to the lower limit value or more of the aforementioned range, the non-conductive particles can be strongly bound to each other through the particulate polymer, and falling of the non-conductive particles from the porous membrane can be prevented. Further, high temperature cycle property of the lithium ion secondary battery can also be improved. On the other hand, by adjusting it to the upper limit value or less, porosity of the porous membrane can be increased. That in turn facilitate passage of ions through the porous membrane, and resistance of the lithium ion secondary battery can thereby be reduced. Consequently, by confining the amount of the particulate polymer in the aforementioned range, both ion penetrability and binding property of the porous membrane can be improved.

The method for producing the particulate polymer is not particularly limited and any methods such as a solution polymerization method, a suspension polymerization method, and an emulsion polymerization method may be used. Among them, the emulsion polymerization method and the suspension polymerization method are preferable since these methods allow polymerization in water and the resulting product as it is can be used as materials for the porous membrane slurry. When the particulate polymer is produced, the reaction system preferably includes a dispersant.

[1.4. Solvent]

As the solvent, it is preferable to use an aqueous solvent. Examples of the aqueous solvent may include: water; ketones such as diacetone alcohol and γ-butyrolactone; alcohols such as ethyl alcohol, isopropyl alcohol, and normal propyl alcohol; glycol ethers such as propylene glycol monomethyl ether, methyl cellosolve, ethyl cellosolve, ethylene glycol tertiary butyl ether, butyl cellosolve, 3-methoxy-3-methyl-1-butanol, ethylene glycol monopropyl ether, diethylene glycol monobutyl ether, triethylene glycol monobutyl ether, and dipropylene glycol monomethyl ether; and ethers such as 1,3-dioxolane, 1,4-dioxolane, and tetrahydrofuran. As the solvent, one type thereof may be solely used, and two or more types thereof may also be used in combination at any ratio. Among them, water is preferable because it is not flammable and use thereof can reduce cost for recycling.

The amount of the solvent is adjusted so that solid content concentration of the porous membrane slurry is preferably 35% by weight or more and more preferably 38% by weight or more, and is preferably 50% by weight or less and more preferably 48% by weight or less. By confining the amount of the solvent in this range, dispersibility of the non-conductive particles in the porous membrane slurry can be particularly improved. The solid content in a composition herein refers to a component that is not evaporated and remains after the composition is dried for removing the solvent.

[1.5. Other Components]

The porous membrane slurry may contain optional components in addition to the aforementioned non-conductive particles, water-soluble polymer, particulate polymer, and solvent. As such optional components, one type thereof may be solely used, and two or more types thereof may also be used in combination at any ratio.

For example, the porous membrane slurry may contain a thickener. By containing the thickener, the porous membrane slurry can have high viscosity and can have improved coating properties. Further the thickener usually remains in the porous membrane and can exert a function of binding of the non-conductive particles.

Examples of the thickener may include water-soluble polysaccharides, and among them, a cellulose-based semi-synthetic polymeric compound is preferable. Examples of the cellulose-based semi-synthetic polymeric compound may include a nonionic cellulose-based semi-synthetic polymeric compound, an anionic cellulose-based semi-synthetic polymeric compound, and a cationic cellulose-based semi-synthetic polymeric compound.

Examples of the nonionic cellulose-based semi-synthetic polymeric compound may include: alkyl celluloses such as methyl cellulose, methylethyl cellulose, ethyl cellulose, and microcrystalline cellulose; and hydroxyalkyl celluloses such as hydroxyethyl cellulose, hydroxybutyl methyl cellulose, hydroxypropyl cellulose, hydroxypropyl methyl cellulose, hydroxyethyl methyl cellulose, hydroxypropyl methyl cellulose stearoxy ether, carboxymethyl hydroxyethyl cellulose, alkyl hydroxyethyl cellulose, and nonoxynyl hydroxyethyl cellulose.

Examples of the anionic cellulose-based semi-synthetic polymeric compound may include substituted alkyl celluloses obtained by substituting the aforementioned nonionic cellulose-based semi-synthetic polymeric compounds with a variety of derivative groups, as well as sodium salts and ammonium salts thereof. Specific examples thereof may include sodium cellulose sulfate, methyl cellulose, methyl ethyl cellulose, ethyl cellulose, carboxymethyl cellulose (CMC), and salts thereof.

Examples of the cationic cellulose-based semi-synthetic polymeric compound may include low nitrogen hydroxyethyl cellulose dimethyl diallylammonium chloride (polyquaternium-4), O-[2-hydroxy-3-(trimethylammonio)propyl] hydroxyethyl cellulose chloride (polyquaternium-10), and O-[2-hydroxy-3-(lauryldimethylammonio)propyl]hydroxyethyl cellulose chloride (polyquaternium-24).

As the thickener, one type thereof may be solely used, and two or more types thereof may also be used in combination at any ratio.

The etherification degree of the cellulose-based semi-synthetic polymeric compound is preferably 0.5 or more and more preferably 0.6 or more, and is preferably 1.0 or less and more preferably 0.8 or less. The etherification degree herein refers to a degree of substitution of (three) hydroxyl groups with a substituent such as a carboxymethyl group per one anhydrous glucose unit in cellulose. Theoretically the etherification degree may have a value of 0 to 3. When the etherification degree falls within the aforementioned range, the cellulose-based semi-synthetic polymeric compound is adsorbed on the surface of the non-conductive particles while keeping compatibility to water, and thus high dispersibility can be obtained and the non-conductive particles can be dispersed at a high dispersing degree.

Further, when a polymer is used as the thickener, the average polymerization degree of the thickener, which is calculated from a limiting viscosity obtained with an Ubbelohde viscometer, is preferably 500 or more and more preferably 1,000 or more, and is preferably 2,500 or less, more preferably 2,000 or less, and particularly preferably 1,500 or less. The average polymerization degree of the thickener may affect fluidity of the porous membrane slurry, uniformity of the porous membrane, and production processes. By confining the average polymerization degree within the aforementioned range, it becomes possible to improve stability of the porous membrane slurry over the lapse of time and perform coating without causing aggregates or thickness unevenness.

The amount of the thickener is preferably 0.03 parts by weight or more, more preferably 0.05 parts by weight or more, and particularly preferably 1 part by weight or more, and is preferably 5 parts by weight or less, more preferably 4 parts by weight or less, and particularly preferably 3 parts by weight or less, relative to 100 parts by weight of the non-conductive particles. By adjusting the amount of the thickener to the lower limit value or more of the aforementioned range, mechanical strength of the porous membrane can be improved. On the other hand, by adjusting it to the upper limit value or less, flexibility of the porous membrane can be improved.

The weight ratio of the thickener and the water-soluble polymer (thickener/water-soluble polymer) is preferably 0.5 or more, more preferably 0.8 or more, and particularly preferably 1 or more, and is preferably 5 or less, more preferably 4 or less, and particularly preferably 3 or less. By adjusting the weight ratio to the lower limit value or more of the aforementioned range, heat resistance of the porous membrane can be further improved. On the other hand, by adjusting it to the upper limit value or less, dispersibility of the non-conductive particles can be further improved.

Further, the porous membrane slurry may contain, e.g., a surfactant. By containing the surfactant in the porous membrane slurry, coating properties of the porous membrane slurry can be improved, and thus it becomes possible to prevent repelling of the porous membrane slurry during coating and improve smoothness of the porous membrane.

Examples of the surfactant may include alkyl-based surfactants, silicon-based surfactants, fluorine-based surfactants, and metal-based surfactants. Among them, the alkyl-based surfactants and the fluorine-based surfactants are preferable, the alkyl-based surfactants are more preferable, and nonionic alkyl-based surfactants are particularly preferable.

Examples of the nonionic alkyl-based surfactants may include polyoxyethylene nonyl phenyl ether, polyethylene glycol monostearate, ethylene oxide-propylene oxide copolymer, and sorbitan monostearate.

As the surfactant, one type thereof may be solely used, and two or more types thereof may also be used in combination at any ratio.

The amount of the surfactant is preferably 0.01 parts by weight or more, more preferably 0.05 parts by weight or more, and particularly preferably 0.1 parts by weight or more, and is preferably 2 parts by weight or less, preferably 1 part by weight or less, and particularly preferably 0.7 parts by weight or less, relative to 100 parts by weight of the non-conductive particles. By adjusting the amount of the surfactant to the lower limit value or more of the aforementioned range, coating properties of the porous membrane slurry can be improved. On the other hand, by adjusting it to the upper limit value or less, heat resistance of the porous membrane can be improved.

Further, the porous membrane slurry may contain, e.g., a chelate agent. The chelate agent is a chemical compound containing a ligand (usually a multidentate ligand) capable of forming a chelate compound by binding to a metal ion. By containing the chelate agent in the porous membrane slurry, a transition metal ion in the porous membrane slurry can be captured, and thus iron ion concentration in the porous membrane slurry can be easily reduced.

Examples of the chelate agent may include amino carboxylic acid-based chelate compounds, phosphonic acid-based chelate compounds, gluconic acid, citric acid, malic acid, and tartaric acid. Among them, it is particularly preferable that the chelate agent can selectively capture the transition metal ion without capturing a lithium ion, and the amino carboxylic acid-based chelating compounds and the phosphonic acid-based chelate compounds are particularly preferable.

Examples of the amino carboxylic acid-based chelate compounds may include ethylenediaminetetraacetic acid (EDTA), nitrilotriacetic acid (NTA), trans-1,2-diaminocyclohexanetetraacetic acid (CyDTA), diethylene-triaminepentaacetic acid (DPTA), bis-(aminoethyl)glycolether-N,N,N',N'-tetraacetic acid (EGTA), N-(2-hydroxyethyl)ethylenediamine-N,N',N'-triacetic acid (HEDTA), and dihydroxyethyl glycine (DHEG).

Examples of the phosphonic acid-based chelate compounds may include 1-hydroxyethane-1,1-diphosphonic acid (HEDP).

As the chelate agent, one type thereof may be solely used, and two or more types thereof may also be used in combination at any ratio.

The amount of the chelate agent is preferably 0 parts by weight or more, and is preferably 10 parts by weight or less, more preferably 5 parts by weight or less, and particularly preferably 3 parts by weight or less, relative to 100 parts by weight of the non-conductive particles. By adjusting the amount of the chelate agent to the upper limit value or less of the aforementioned range, deterioration of the high temperature cycle property caused by the chelate agent can be prevented.

[1.6. Physical Properties of Porous Membrane Slurry]

The porous membrane slurry of the present invention has excellent dispersibility of the non-conductive particles. Thus it can prevent formation of large particles caused by aggregation of the non-conductive particles. Since the organic separator layer can be prevented from being damaged by the large particles, it becomes possible to improve safety of the lithium ion secondary battery by preventing the short circuit thereof.

The iron ion concentration in the porous membrane slurry is preferably 500 ppm or less, more preferably 100 ppm or less, and particularly preferably 50 ppm or less on a weight basis. On the other hand, the lower limit is preferably 5 ppm or more, more preferably 6 ppm or more, and particularly preferably 7 ppm or more. By adjusting the iron ion concentration to the lower limit value or more of the aforementioned range, stabilization on electrode surfaces in an initial charging and discharging period can be proceeded effectively, and thus cycle property of the lithium ion secondary battery can be improved. On the other hand, by adjusting it to the upper limit value or less, dispersion stability of the porous membrane slurry can be improved. As a result, by confining the iron ion concentration in the porous membrane slurry within the aforementioned range, both the cycle property of the lithium ion secondary battery and the dispersibility of the porous membrane slurry can be improved. Further, by reducing the iron ion concentration in the porous membrane slurry as described above, the separator is prevented from being damaged due to the deposition of iron, and thus safety of the lithium ion secondary battery can be further improved.

[2. Method for Producing Porous Membrane Slurry]

The porous membrane slurry of the present invention may be produced by, e.g., mixing the non-conductive particles, the water-soluble polymer, the particulate polymer, and, if necessary, a solvent and optional components, simultaneously or in arbitrary order. Especially when the porous membrane slurry includes water as the solvent, it is preferable that the porous membrane slurry is produced by a method including the steps of: (i) mixing the non-conductive particles, the water-soluble polymer, and water to obtain a dispersion of the non-conductive particles having a predetermined concentration; (ii) dispersing the dispersion of the non-conductive particles in a predetermined condition; and (iii) mixing the dispersion of the non-conductive particles and the particulate polymer.

In the step of mixing the non-conductive particles, the water-soluble polymer, and water to obtain the dispersion of the non-conductive particles, water having an electrical conductivity of preferably 30 µS/cm or less, more preferably 20 µS/cm or less, and particularly preferably 15 µS/cm or less is used as the water. By using the water having such low electrical conductivity, resistance of the porous membrane can be reduced. Further the iron ion concentration in the porous membrane slurry can also be reduced. Although there is no lower limitation of the electrical conductivity of water, the electrical conductivity is usually 0.5 µS/cm or more. By adjusting the electrical conductivity of water to the lower limit value or more of the aforementioned range, dispersibility of the non-conductive particles can be further improved by virtue of electrostatic repulsive interaction of ions.

Further, the state of the water-soluble polymer upon mixing with the non-conductive particles and water may be, e.g., an aqueous solution state wherein the water-soluble polymer is dissolved in water, or a solid state without water. However, the water-soluble polymer is usually produced in a state of an aqueous solution. Thus, from the viewpoint of enhancing production efficiency by omitting a step of isolating the water-soluble polymer from the aqueous solution, it is preferable that the water-soluble polymer is mixed with the non-conductive particles and water in the state of the aqueous solution.

The dispersion of the non-conductive particles can be obtained by mixing the non-conductive particles, the water-soluble polymer, and water. The solid content concentration of the dispersion of the non-conductive particles is preferably 40% by weight or more, more preferably 43% by weight or more, and particularly preferably 45% by weight or more, and is preferably 60% by weight or less, more preferably 55% by weight or less, and particularly preferably 50% by weight or less. By adjusting the solid content concentration of the dispersion of the non-conductive particles to the lower limit value or more of the aforementioned range, in the step of dispersing the dispersion of the non-conductive particles, collision of the aggregated non-conductive particles with each other can be effected to crush the particles, and thus dispersibility of the non-conductive particles can be effectively improved. On the other hand, by adjusting it to the upper limit value or less, sufficient force can be applied to each of aggregated masses of the non-conductive particles, and this limitation can also give effective improvement in dispersibility of the non-conductive.

After obtaining the dispersion of non-conductive particles, the dispersion is further dispersed. By this process, the aggregated masses of the non-conductive particles can be crushed and the non-conductive particles can be dispersed. This dispersion treatment is preferably performed under the condition of 2 Wh/kg to 8 Wh/kg. More specifically, the dispersion treatment is performed with energy of preferably 2 Wh or more, more preferably 3 Wh or more, and particularly preferably 4 Wh or more, and is preferably 8 Wh or less and more preferably 7 Wh or less, per 1 kg of the dispersion of the non-conductive particles. By adjusting the energy used for dispersing the dispersion of the non-conductive particles to the lower limit value or more of the aforementioned range, the non-conductive particles can be effectively dispersed. On the other hand, by adjusting it to the upper limit value or less, the non-conductive particles can be prevented from being crushed, and thus the surface area of the non-conductive particles can be prevented from being excessively increased. As a result, high temperature cycle property of the lithium ion secondary battery can be improved. Further by performing the dispersion treatment with such low energy, elution of the iron ion from the dispersion device can be suppressed, and thus the iron ion concentration in the porous membrane slurry can be kept at a low level.

The dispersion device for use in the dispersion treatment may be any dispersion device that can disperse the non-conductive particles by crushing the aggregated masses of the non-conductive particles. Examples of the dispersion devices may include a ball mill, a bead mill, a sand mill, a media-less dispersing device, a pigment-dispersing device, a grinding machine, an ultrasonic dispersing device, a homogenizer, a planetary mixer, and a Hobart mixer. Among them, the media-less dispersing device is preferable since shearing force can be mildly applied and the specific surface area of the non-conductive particles can thereby be confined in a predetermined range.

After the dispersing is performed in this manner, the dispersion of non-conductive particles is mixed with the particulate polymer, to thereby obtain the porous membrane slurry. Further, in this production method, there is no limitation to the timing of mixing the optional components.

The method for producing the porous membrane slurry may further include optional steps other than the aforementioned steps. For example, a step for confining the iron ion concentration in the porous membrane slurry within a predetermined range may be performed.

The step for confining the iron ion concentration in the porous membrane slurry within the predetermined range is not particularly limited. For example, a step of magnetically removing a magnetic substance is preferable, a step of removing the magnetic substance by a magnet is more preferable, and among these, a step of removing the magnetic substance by a bar magnet is further preferable. In this step, magnetic force of the bar magnet and number of the bar magnet may be appropriately adjustable in accordance with the magnetic substance to be removed. For example, by passing the bar magnet through the porous membrane slurry, the magnetic substance in the porous membrane slurry is attached to the bar magnet, and thus the magnetic substance can be removed from the porous membrane slurry. A magnetic substance-removing device using a bar magnetic is available, e.g., under the name of Magnetic Separator sold by Nippon Magnetics, Inc. and Magnet Filter sold by TOK Engineering Co., Ltd.

The magnet to be used may be a magnet capable of forming a magnetic field having a sufficient magnetic flux density for capturing a magnetic substance potentially contaminated in: the porous membrane slurry; and raw material liquids for the porous membrane slurry such as the dispersion of the non-conductive particles, the aqueous solution of the water-soluble polymer, the aqueous dispersion of the particulate polymer, and solvents. The specific magnetic flux density is preferably 100 gauss or higher from the viewpoint of appropriately adsorbing and removing the magnetic substance when it is included in the porous membrane slurry and the raw material liquids thereof. Further, from the viewpoint of increasing removal efficiency of the magnetic substance, the magnetic flux density is more preferably 1,000 gauss or higher. Further, from the viewpoint of removing a substance with weak magnetism, the magnetic flux density is further preferably 5,000 gauss or higher and particularly preferably 8,000 gauss or higher.

[3. Separator]

The separator for a lithium ion secondary battery of the present invention (this may appropriately be referred to hereinbelow as a "separator") includes an organic separator layer and a porous membrane.

[3.1. Organic Separator Layer]

As the organic separator layer, e.g., a porous substrate having micropores may be used. By using such organic separator layer, short circuit of electrodes in a secondary battery can be prevented without hindering charging and discharging of the battery. Examples of the organic separator layer may include microporous membranes or nonwoven fabrics that contain polyolefin resins such as polyethylene resin and polypropylene resin, and aromatic polyamide resins.

The thickness of the organic separator layer is preferably 0.5 µm or more and more preferably 1 µm or more, and is preferably 40 µm or less, more preferably 30 µm or less, and particularly preferably 10 µm or less. Within this range, the resistance caused by the organic separator layer in the secondary battery is decreased, and excellent workability is provided in the production of the battery.

[3.2. Porous Membrane]

The porous membrane is obtained by applying onto the organic separator layer the porous membrane slurry of the present invention and drying the slurry. In this process, the porous membrane may be formed on either one side or both sides of the organic separator layer.

Examples of methods of applying the porous membrane slurry may include a doctor blade method, a dipping method, a die coating method, a reverse roll coating method, a direct roll coating method, a gravure coating method, an extrusion coating method, and a brush coating method. The application amount of the porous membrane slurry is usually set in a range such that the porous membrane having a desired thickness can be obtained. By the application of the porous membrane slurry on the organic separator layer, a layer of the porous membrane slurry is formed on the organic separator layer.

After the layer of the porous membrane slurry is formed on the organic separator layer, the layer is dried. By the drying, the solvent in the layer of the porous membrane slurry is removed and the porous membrane can be obtained. Examples of drying methods may include: drying using an air such as warm air, hot air, and low-humidity air; vacuum drying; and drying using irradiation of energy ray such as infrared ray, far infrared ray, and electron beam.

The drying temperature is preferably 30° C. or higher, more preferably 40° C. or higher, and particularly preferably 45° C. or higher, and is preferably 90° C. or lower, more preferably 80° C. or lower, and particularly preferably 70° C. or lower. By adjusting the drying temperature to the lower limit value or more of the aforementioned range, the solvent can be efficiently removed from the porous membrane slurry. On the other hand, by adjusting it to the upper limit value or less, shrinkage of the organic separator layer due to heat can be suppressed.

The drying time is preferably 5 seconds or longer, more preferably 10 seconds or longer, and particularly preferably 15 seconds or longer, and is preferably 5 minutes or shorter, more preferably 4 minutes or shorter, and particularly preferably 3 minutes or shorter. By adjusting the drying time to the lower limit value or more of the aforementioned range, the solvent can be sufficiently removed from the porous membrane, and thus output property of the battery can be improved. On the other hand, by adjusting it to the upper limit value or less, production efficiency can be improved.

When the porous membrane is produced, optional operations in addition to the aforementioned ones may be performed. For example, the porous membrane may be subjected to a pressurizing treatment by pressing methods such as a die press and a roll press. By performing the pressurizing treatment, binding property between the organic separator layer and the porous membrane can be enhanced. However, when the pressurizing treatment is excessively performed, porosity of the porous membrane may be deteriorated, and thus it is preferable that pressure and pressurizing time are appropriately controlled. Further, it is preferable to perform drying in vacuum or in a dry room for removing residual moisture. It is also preferable to perform a heat treatment, by which thermal cross-linking groups in the binder are cross-linked, and thereby the binding force is further enhanced.

In the porous membrane thus obtained, pores are formed in the space between the non-conductive particles. Thus the porous membrane has a porous structure. Thereby the porous membrane exhibits liquid permeability, and accordingly ion movement is not hindered by the porous membrane. As a result, in the lithium ion secondary battery, battery reaction is not inhibited by the porous membrane. Further, since the non-conductive particles do not have electric conductivity, the porous membrane exhibits insulating property.

Further the porous membrane thus obtained has excellent mechanical strength. Thus, the resulting separator is not easily damaged even when some external force is applied to the battery. Further such a porous membrane is hardly broken even when it is pressurized or bent during the production processes. Further, even when the organic separator layer shrinks by temperature changes, the porous membrane is able to resist the shrinkage stress, and thus deformation of the separator can be prevented.

Furthermore, the porous membrane usually exhibits excellent heat resistance. Thus the separator of the present invention provided with the porous membrane can stably prevent short circuit even in higher temperatures.

Consequently, safety of the secondary battery can be improved by having the porous membrane.

Further the porous membrane usually has low moisture content. Therefore deterioration of the battery properties such as high temperature cycle property of the lithium ion secondary battery caused by the moisture is less likely to occur, it is possible to realize a lithium ion secondary battery having high performance.

The thickness of the porous membrane is preferably 0.1 µm or more, more preferably 0.2 µm or more, and particularly preferably 0.3 µm or more, and is preferably 20 µm or less, more preferably 15 µm or less, and particularly preferably 10 µm or less. By adjusting the thickness of the porous membrane to the lower limit value or more of the aforementioned range, heat resistance of the porous membrane can be further improved. On the other hand, by adjusting it to the upper limit value or less, reduction of ion permeability caused by the porous membrane can be reduced.

[4. Lithium Ion Secondary Battery]

The lithium ion secondary battery of the present invention includes a positive electrode, a negative electrode, the separator of the present invention, and an electrolytic solution. Specifically, the lithium ion secondary battery of the present invention includes a positive electrode, the separator of the present invention, and a negative electrode in this order, and further includes an electrolytic solution. The lithium ion secondary battery of the present invention is excellent in both safety and high temperature cycle property.

[4.1. Positive Electrode and Negative Electrode]

Each of the positive and negative electrodes as electrodes usually includes a current collector and an electrode active material layer provided on the current collector.

As the current collector, materials having electrical conductivity and electrochemical durability may be used. In particular, preferable examples thereof in view of having heat resistance may include metallic materials such as iron, copper, aluminum, nickel, stainless steel, titanium, tantalum, gold, and platinum. Of these, aluminum is particularly preferable for positive electrode current collectors, and copper is particularly preferable for negative electrode current collectors.

The shape of the current collector is not particularly limited, but the current collector is preferably in a sheet shape with a thickness of 0.001 mm or more and 0.5 mm or less.

The current collector is preferably subjected to a surface roughening process before use for increasing adhesive strength to the electrode active material layer. Examples of the surface roughening method may include a mechanical polishing method, an electrolytic polishing method, and a chemical polishing method. In the mechanical polishing method, e.g., a coated abrasive having abrasive particles bonded thereto, a grinding stone, an emery wheel, and a wire brush having steel wires may be used.

To increase conductivity and adhesive strength to the electrode active material layer, an intermediate layer may be formed on the surface of the current collector.

The electrode active material layer is a layer containing an electrode active material. As the electrode active material, materials that permit reversible intercalation and deintercalation of lithium ions by application of electropotential in the electrolyte solution may be used. For the electrode active material, any of inorganic compounds and organic compounds may be used.

The positive electrode active materials are roughly classified into materials made of inorganic compounds and materials made of organic compounds. Examples of the positive electrode active materials made of inorganic compounds may include transition metal oxides, complex oxides of lithium and transition metals, and transition metal sulfides. As the transition metals, e.g., Fe, Co, Ni, and Mn are used. Specific examples of the inorganic compounds used for the positive electrode active material may include lithium-containing complex metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. On the other hand, examples of the positive electrode active materials made of organic compounds may include electroconductive polymers such as polyacetylene and poly-p-phenylene.

Furthermore, positive electrode active materials made of composite materials containing inorganic compounds and organic compounds in combination may also be used.

For example, iron-based oxides are subjected to reduction firing in the presence of carbon source materials to produce composite materials covered with carbon materials, and these composite materials may be used as the positive electrode active material. Iron-based oxides tend to have low electrical conductivity. However, when the iron-based oxides are formulated in a form of the aforementioned composite materials, they can be used as the positive electrode active material with high performance.

Furthermore, materials obtained by partial element substitution of the aforementioned compounds may also be used as the positive electrode active material.

One type of these positive electrode active materials may be used alone, or two or more types thereof may be used in combination at any ratio. Moreover, mixtures of the aforementioned inorganic compounds and organic compounds may also be used as the positive electrode active material.

The particle diameter of the positive electrode active material is appropriately selected in conformity with other constituents of the secondary battery. From the viewpoint of improvement in battery properties, such as load property and cycle property, the volume average particle diameter of the positive electrode active material is preferably 0.1 µm or more and more preferably 1 µm or more, and is preferably 50 µm or less and more preferably 20 µm or less. When the volume average particle diameter of the positive electrode active material is in this range, a battery with large charging/discharging capacity can be obtained, and handling during the production of the active material layer slurry and the electrode can be easily performed.

Examples of the negative electrode active material may include carbonaceous materials such as amorphous carbon, graphite, natural graphite, mesocarbon microbeads, and pitch-based carbon fiber; and conductive polymers such as polyacene. Examples also may include metals such as silicon, tin, zinc, manganese, iron, and nickel, and alloys thereof; oxides of the metals and alloys; and sulfates of the metals and alloys. In addition, metal lithium; lithium alloys such as Li—Al, Li—Bi—Cd, and Li—Sn—Cd; lithium transition metal nitrides; silicon, and others may be used. Furthermore, electrode active materials in which a conductive material is attached to the surface by mechanical reforming may also be used. One type of the negative electrode active material may be used alone, or two or more types thereof may be used in combination at any ratio.

The particle diameter of the negative electrode active material is appropriately selected in conformity with other constituents of the lithium ion secondary battery. From the viewpoint of improvement in battery properties, such as initial efficiency, load property, and cycle property, the volume average particle diameter of the negative electrode active material is preferably 1 μm or more and more preferably 15 μm or more, and is preferably 50 μm or less and more preferably 30 μm or less.

The electrode active material layer preferably contains a binder for an electrode in addition to the electrode active material. By containing the binder for an electrode, binding property of the electrode active material layer in the electrode is improved to increase strength against mechanical force which is applied during production steps such as electrode winding process. The binder also prevents detachment of the electrode active material layer in the electrode to reduce a risk of short circuit, etc. due to detached materials.

As the binder for an electrode, e.g., polymers may be used. Example thereof for use may include polyethylene, polytetrafluoroethylene (PTFE), polyvinylidene fluoride (PVDF), tetrafluoroethylene-hexafluoropropylene copolymer (FEP), polyacrylic acid derivatives, and polyacrylonitrile derivatives. Further, the same polymers as those for the binders for a porous membrane may also be used. As the binder for electrode, one type thereof may be solely used, and two or more types thereof may also be used in combination at any ratio.

The amount of the binder for electrodes in the electrode active material layer is preferably 0.1 parts by weight or more, more preferably 0.2 parts by weight or more, and particularly preferably 0.5 parts by weight or more, and is preferably 5 parts by weight or less, more preferably 4 parts by weight or less, and particularly preferably 3 parts by weight or less, relative to 100 parts by weight of the electrode active material. When the amount of the binder for electrodes is in the aforementioned range, falling of the electrode active material from the electrode can be prevented without inhibiting the battery reactions.

The electrode active material layer may contain optional components, in addition to the electrode active material and the binder for electrodes unless the optional components significantly impair the effects of the present invention. Examples of the optional components may include conductive materials and reinforcing materials. As the optional component, one type thereof may be solely used, and two or more types thereof may also be used in combination at any ratio.

Examples of the conductive material may include conductive carbons such as acetylene black, Ketjen black, carbon black, graphite, vapor-grown carbon fiber, and carbon nanotube; carbon powders such as black lead; and fibers and foils of a variety of metals. Use of the conductive material can improve electrical contact between the electrode active materials and can improve battery properties such as cycle property.

As the reinforcing material, e.g., a variety of inorganic and organic spherical, plate-shaped, rod-shaped, or fibrous fillers may be used.

The amounts of the conductive material used and the reinforcing agent used are each usually 0 parts by weight or more and preferably 1 part by weight or more, and is preferably 20 parts by weight or less and more preferably 10 parts by weight or less, relative to 100 parts by weight of the electrode active material.

The thickness of the electrode active material layer in both the positive and negative electrodes is preferably 5 μm or more and more preferably 10 μm or more, and is preferably 300 μm or less and more preferably 250 μm or less.

There is no particular limitation on the method for producing the electrode active material layer. The electrode active material layer may be produced by, e.g., applying onto the current collector the active material layer slurry containing the electrode active material, a solvent, and if necessary the binder for electrodes and optional components, and drying the slurry. As the solvent, any of water and organic solvents may be used.

[4.2. Electrolyte Solution]

As the electrolyte solution, e.g., a solution of a lithium salt as a supporting electrolyte in a non-aqueous solvent may be used. Examples of the lithium salt may include lithium salts such as $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. In particular, $LiPF_6$, $LiClO_4$, and $CF_3SO_3Li$ are preferably used because they are easily dissolved in solvents to exhibit high degree of dissociation. One type of them may be solely used, and two or more types thereof may also be used in combination at any ratio.

The amount of the supporting electrolyte is preferably 1% by weight or more and more preferably 5% by weight or more, and is preferably 30% by weight or less and more preferably 20% by weight or less relative to the electrolyte solution. By confining the amount of the supporting electrolyte within this range, it becomes possible to increase ionic conductivity to obtain favorable charging property and discharging property of the lithium ion secondary battery.

As a solvent for the electrolyte solution, solvents that are capable of dissolving the supporting electrolyte may be used. Examples of the solvent to be used may include alkyl carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulphur-containing compounds such as sulfolane and dimethyl sulfoxide. In particular, dimethyl carbonate, ethylene carbonate, propylene carbonate, diethyl carbonate, and methyl ethyl carbonate are preferable because therewith high ion conductivity can be easily obtained and they have wide operating temperature range. As the solvent, one type thereof may be solely used, and two or more types thereof may also be used in combination at any ratio.

The electrolyte solution may also optionally contain an additive. Preferable examples of the additive may include carbonate compounds such as vinylene carbonate (VC). As the additive, one type thereof may be solely used, and two or more types thereof may also be used in combination at any ratio.

[4.3. Production Method]

Examples of the method for producing a lithium ion secondary battery may include a method in which electrodes and a separator are stacked in suitable combination, then rolled, bent, or so in conformity with the battery shape, placed in a battery container, and an electrolyte solution is injected into a battery container, followed by sealing of the battery container. If necessary, overcharging/overdischarging and pressure increase inside a battery may be prevented by installing overcurrent protection elements such as a fuse and a PTC element, or a lead plate, expanded metal, or others. Examples of the shape of the battery may be any of a coin shape, a button shape, a sheet shape, a cylindrical shape, a square shape, and a flat shape.

EXAMPLES

The present invention will be described hereinbelow in detail by way of Examples. However, the present invention is not limited to the following Examples and may be optionally modified for implementation without departing from the scope of the claims and equivalents thereto.

Unless otherwise specified, "%" and "part" expressing the quantity in the following description are based on weight. Unless otherwise specified, the procedures described in the following were carried out under the conditions of normal temperature and normal pressure.

[Evaluation Methods]

(Method for Measuring BET Specific Surface Area of Non-Conductive Particles)

The BET specific surface area is a value obtained by a BET method. The BET specific surface area of the non-conductive particles was measured by a wet-type specific surface area measuring apparatus ("FlowSorb III 2305" manufactured by Shimadzu Corp.).

(Method for Measuring D10, D50 and D90 of Non-Conductive Particles)

The porous membrane slurry was measured by a laser diffraction particle size distribution measuring apparatus ("SALD-2000" manufactured by Shimadzu Corp.) to obtain D10, D50, and D90 of the non-conductive particles.

(Method for Measuring Aspect Ratio of Non-Conductive Particles)

Fifty particles in a photograph image taken by a transmission electron microscope (SEM) were selected for an image analysis to measure an aspect ratio of each particle. The average value thereof was then calculated to obtain the aspect ratio of the non-conductive particles. Specifically, the fifty particles were selected in an order from the one with the largest size from the entire image of the non-conductive particles with 100 magnifications. Then, each of the particles was observed one by one with 1,000 magnifications, and the aspect ratio of the non-conductive particles was measured using printed photographs.

(Method for Measuring Iron Ion Concentration in Porous Membrane Slurry)

The porous membrane slurry obtained in Examples and Comparative Examples was filtered through a magnetic filter (manufactured by TOK Engineering Co., Ltd.) under the conditions of room temperature and magnetic flux density of 16,000 gauss, and particulate metal remaining in the magnetic filter was dissolved with an acid to obtain a sample solution. This sample solution was subjected to ICP (Inductively Coupled Plasma) to measure the iron ion concentration contained in the porous membrane slurry.

(Method for Measuring Moisture Content of Separator)

The separator having the porous membrane was cut out in a size of 10 cm width×10 cm length to obtain a test piece. This test piece was left to stand for 24 hours at the temperature of 25° C. and the humidity of 50%. Subsequently, the moisture content of the test piece was measured by a Karl Fischer method (JIS K-0068 (2001) water evaporation method, vaporization temperature of 150° C.) using a coulometric titration moisture analyzer. This moisture content was represented by (W1).

Subsequently, the moisture content of a test piece, which had been left to stand for 24 hours at the temperature of 25° C., the dew point of −60° C., and the humidity of 0.05%, was measured in the same manner as described above. This moisture content was represented by (W2).

From the values of the moisture content W1 and W2 thus obtained, a ratio W1/W2 was calculated.

The calculated ratio W1/W2 was evaluated in accordance with the following standards. Smaller value of the difference between W1 and W2 is indicative of smaller moisture content of the porous membrane. When the moisture content of the porous membrane is small, curling of the separator in a dry room for producing the battery can be reduced. Further, smaller moisture content in the porous membrane is preferable since thereby a side reaction in the secondary battery due to the moisture is prevented and the battery properties such as the high temperature cycle property are not deteriorated.

A: W1/W2 is less than 1.5.
B: W1/W2 is 1.5 or more but less than 2.0.
C: W1/W2 is 2.0 or more but less than 2.5.
D: W1/W2 is 2.5 or more but less than 3.0.
E: W1/W2 is 3.0 or more.

(Method for Evaluating Powder Falling Property)

The separator having the porous membrane was cut out in 1 cm width×5 cm length to obtain a test piece. The test piece was placed on a table with the porous membrane-side surface facing upward, and a stainless steel rod having a diameter of 1 mm was laid on the organic separator layer-side surface at the center of the long length direction (a location 2.5 cm away from both ends) with the direction of the stainless steel rod being along the short length direction. The test piece was then bent by 180° around the stainless steel rod in such a way that the porous membrane-side surface became an outer side. After performing the aforementioned test with ten test pieces, the bent portion of the porous membrane of each test piece was observed as to whether cracks or powder falling occurred and evaluated in accordance with the following criteria. The powder falling herein refers to falling of the non-conductive particles from the porous membrane. Less frequent occurrence of the cracks and the powder falling is indicative of better powder falling property of the porous membrane formed on the organic separation layer.

A: No cracks or powder falling observed in any 10 pieces.
B: Crack or powder falling observed in 1 to 3 pieces out of 10 pieces.
C: Crack or powder falling observed in 4 to 6 pieces out of 10 pieces.
D: Crack or powder falling observed in 7 to 9 pieces out of 10 pieces.
E: Crack or powder falling observed in all 10 pieces.

(Method for Evaluating Dispersibility of Porous Membrane Slurry)

By using a laser diffraction particle size distribution measuring apparatus ("SALD-2000" manufactured by Shimadzu Corp.), D50 of the non-conductive particles in the porous membrane slurry after preparation was obtained. The dispersibility of the porous membrane slurry was evaluated by classifying the D50 in accordance with the following criteria. The D50 of the non-conductive particles in the porous membrane slurry being closer to the primary particle diameter of the non-conductive particles is indicative of better dispersibility of the porous membrane slurry.

A: D50 of non-conductive particles in porous membrane slurry is not 1.2 or more times larger than primary particle diameter of non-conductive particles.
B: D50 of non-conductive particles in porous membrane slurry is 1.2 or more times larger but not 1.4 or more times larger than primary particle diameter of non-conductive particles.
C: D50 of non-conductive particles in porous membrane slurry is 1.4 or more times larger but not 1.6 or more times larger than primary particle diameter of non-conductive particles.

D: D50 of non-conductive particles in porous membrane slurry is 1.6 or more times larger but not 1.8 or more times larger than primary particle diameter of non-conductive particles.

E: D50 of non-conductive particles in porous membrane slurry is 1.8 or more times larger than primary particle diameter of non-conductive particles.

Further, the primary particle diameter of the non-conductive particles was measured by performing SEM observation as follows. Specifically, the non-conductive particles were photographed by a field emission scanning electron microscope ("Hitachi S-4700" manufactured by Hitachi High Technologies, Inc.) with a magnification of 25,000, and 200 particles were selected arbitrarily from the photographed images. The longest diameter of each particle on the images is denoted by La and the shortest diameter of each particle on the images is denoted by Lb, and a particle diameter was defined as (La+Lb)/2. A number average particle diameter was calculated as an average value of the 200 particles. The number average particle diameter value thus obtained was used as the primary particle diameter of the non-conductive particles.

(Method for Evaluating High Temperature Cycle Property of Secondary Battery)

Using a laminate-type lithium ion secondary battery, charging and discharging were repeated for 100 cycles, wherein charging was performed from 3V to 4.3V at 0.2 C at 45° C. and discharging was performed from 4.3V to 3V at 0.2 C. A ratio of a discharging capacity at the 100th cycle with respect to the discharging capacity at the 2nd cycle was calculated as percentage to obtain a capacity maintenance ratio. The capacity maintenance ratio was evaluated in accordance with the following criteria. It can be determined that the battery having larger value of the capacity maintenance ratio has smaller reduction in the discharging capacity and better high temperature cycle property.

A: Capacity maintenance ratio is 95% or more.

B: Capacity maintenance ratio is 90% or more but less than 95%.

C: Capacity maintenance ratio is 85% or more but less than 90%.

D: Capacity maintenance ratio is 80% or more but less than 85%.

E: Capacity maintenance ratio is less than 80%.

Example 1

1.1. Production of Alumina Particles

Aluminum hydroxide having a volume average particle diameter of 2.8 μm was obtained by a Bayer method and charged into a box-type sagger with a charging density of 0.61 g/cm$^3$. The box-type sagger was placed in a stationary electric furnace ("Siliconit Furnace" manufactured by Siliconit Konetsu Kogyo Co., Ltd.) and sintered at a sintering temperature of 1,180° C. for 10 hours. Subsequently α-alumina particles produced were taken out of the furnace.

A vibrating ball mill ("Vibrational Mill" manufactured by Chuo Kakohki Co., Ltd.) containing 7.8 kg of alumina balls with a diameter of 15 mm in a 6-liter volume pot was prepared. 1.0 kg of the α-alumina particles and 15 g of ethanol were put in this pot, and crushing was performed for 36 hours to obtain α-alumina particles having a volume average particle diameter of 0.6 μm. The volume average particle diameter of the α-alumina particles was measured by a nano-particle distribution measurement apparatus ("SALD-7100" manufactured by Shimadzu Corp.).

The aspect ratio and the primary particle diameter of the α-alumina particles thus obtained were measured in the aforementioned manners.

1.2. Production of Particulate Polymer a

To a reaction vessel equipped with a stirrer, 70 parts of ion exchange water, 0.15 parts of sodium lauryl sulfate ("EMAL 2F" manufactured by Kao Chemicals) as an emulsifier, and 0.5 parts of ammonium persulfate were supplied, and a gas phase portion was replaced with a nitrogen gas. Then the mixture was heated to 60° C.

In the meantime, in another vessel, 50 parts of ion exchange water, 0.5 parts of sodium dodecylbenzene sulfonate, 2 parts of acrylonitrile as a nitrile group-containing monomer, 93.8 parts of butyl acrylate as a (meth)acrylic ester monomer, 2 parts of methacrylic acid as an ethylenically unsaturated acid monomer, 1 part of allyl glycidyl ether and 1.2 parts of N-methylolacrylamide as a crosslinkable monomers, and 0.15 parts of a chelate agent ("CHELEST400G" (sodium ethylenediaminetetraacetic acid tetrahydrate) manufactured by CHELEST Corp.) were mixed to obtain a monomer mixture. This monomer mixture was continuously added to the reaction vessel over 4 hours to perform polymerization. During the addition, the reaction was performed at 60° C. After the completion of the addition, the reaction mixture was stirred for another 3 hours at 70° C., and then the reaction was terminated. As a result, an aqueous dispersion of particulate polymer A was produced.

1.3. Production of Water-Soluble Polymer a 50 parts of water, 80 parts of acrylic acid, 19.92 parts of acrylamide-2-methylpropanesulfonic acid, and 0.08 parts of 2-(N-acryloyl)amino-2-methyl-1,3-propane-disulfonic acid were mixed to obtain a monomer composition.

To a four-necked flask equipped with a thermometer, a stirrer, and a reflux condenser, 150 parts of water was charged and the temperature was raised to 80° C. Then, while stirring, the aforementioned monomer composition and 10 parts of 30% aqueous solution of sodium persulfate were each continuously supplied dropwise to the flask by a constant volume pump over 3 hours and polymerization reaction was performed at 80° C. After the completion of the dropwise addition, the temperature of the system was maintained at 80° C. for another 1 hour for maturation, to complete the polymerization reaction. Then, 120 parts of 32% aqueous solution of sodium hydroxide were added to the flask to completely neutralize the reaction mixture. An aqueous solution of water-soluble polymer A was thus obtained. The weight average molecular weight of the water-soluble polymer A was 6,000.

1.4. Preparation of Dispersion of Non-Conductive Particles 100 parts of the α-alumina particles obtained in the aforementioned step [1.1], 0.5 parts of the aqueous solution of water-soluble polymer A obtained in the aforementioned step [1.3] in terms of the amount of the water-soluble polymer A, and 37.5 parts of 4% aqueous solution of carboxymethyl cellulose (1.5 parts in terms of the amount of the carboxymethyl cellulose) were mixed and the solid content concentration of the mixture was adjusted to 50% by weight by adding water having an electrical conductivity of 10 μS/cm. A dispersion of non-conductive particles was thus obtained.

1.5. Dispersing Dispersion of Non-Conductive Particles

The dispersion of non-conductive particles obtained in the aforementioned step [1.4] was dispersed by a media-less dispersing device ("Inline Mill MKO" manufactured by IKA Works) under the conditions of 4,000 rotations and 5.4 Wh/kg energy for 1 hour.

1.6. Production of Porous Membrane Slurry

The dispersion of non-conductive particles that had been subjected to the dispersion treatment in the aforementioned step [1.5], 13.3 parts of the aqueous dispersion of particulate polymer A obtained in the aforementioned step [1.2] (6 parts in terms of the amount of the particulate polymer A), and 0.5 parts of an aqueous solution of nonionic surfactant in terms of solid content were mixed to obtain a dispersion. The nonionic surfactant is a surfactant produced by polymerizing propylene oxide and ethylene oxide at a polymerization ratio of 50:50.

The dispersion thus obtained was filtered through a pre-filter (mesh size of 20 μm) and then filtered through a magnetic filter (manufactured by TOK Engineering Co., Ltd.) under the conditions of the room temperature and the magnetic flux density of 8,000 gauss to obtain a porous membrane slurry.

Using the porous membrane slurry thus obtained, the D10, D50, and D90, and the BET specific surface area of the non-conductive particles, as well as the dispersibility of the porous membrane slurry were measured in the aforementioned manners. Further, the iron ion concentration in the porous membrane slurry was measured in the aforementioned manner.

1.7. Production of Separator

An organic separator layer comprising a porous substrate made of polypropylene (thickness of 16 μm, Gurley value of 210 s/100 cc) was prepared. The porous membrane slurry was applied onto both surfaces of the prepared organic separator layer and dried at 50° C. for 3 min. In this manner, a separator including the organic separator layer and the porous membrane having a thickness of 3 μm was produced. Using the separator thus obtained, the moisture content of the separator and the powder falling property of the porous membrane were evaluated.

1.8. Method for Producing Positive Electrode

To 95 parts of $LiCoO_2$ as a positive electrode active material, 3 parts of PVDF (polyvinylidene fluoride, "KF-1100" manufactured by Kureha Kagaku Corp.) in terms of solid content was added as a binder for the positive electrode, then 2 parts of acetylene black as a conductivity material and 20 parts of N-methylpyrrolidone as a solvent were further added to the mixture, and the resulting mixture was mixed using a planetary mixer to obtain a positive electrode slurry. The positive electrode slurry was coated onto one surface of an aluminum foil having a thickness of 18 μm and dried at 120° C. for 3 hours. The resultant was then rolled by a roll press to obtain a positive electrode having a positive electrode active material having a total thickness of 100 μm.

1.9. Method for Producing Negative Electrode

In a reaction vessel equipped with a stirrer, 4 parts of sodium dodecylbenzenesulfonate, 0.5 parts of potassium persulfate, and as monomers 33 parts of 1,3-butadiene, 63.5 parts of styrene, and 3.5 parts of itaconic acid, as well as 200 parts of ion exchange water were put and mixed. The mixture was polymerized at 50° C. for 12 hours. Subsequently, unreacted monomers were removed by introducing steam. In this manner, as a binder for negative electrode, an aqueous dispersion containing a polymer for negative electrode in a particulate form was obtained.

In a planetary mixer with a disper, 70 parts of artificial graphite having a specific surface area of 4 $m^2/g$ (volume average particle diameter: 24.5 μm) and 30 parts of $SiO_x$ (manufactured by Shin-Etsu Chemical Co., Ltd; volume average particle diameter of 5 μm) as negative electrode active materials, and 1 part of 1% aqueous solution of carboxymethyl cellulose ("BSH-12" manufactured by Dai-ichi Kogyo Seiyaku Co., Ltd.) in terms of solid content as a dispersant were put, and the solid content concentration of the mixture was adjusted to 55% by adding ion exchange water. Subsequently the mixture was mixed at 25° C. for 60 min. Subsequently, the solid content concentration of the mixture was adjusted to 52% by ion exchange water. The mixture was then stirred at 25° C. for another 15 min to obtain a liquid mixture. To the liquid mixture, 1.0 part by weight of the aqueous dispersion containing the polymer for negative electrode in terms of solid content was added and the final solid content concentration of the mixture was adjusted to 50% by adding ion exchange water. The mixture was then stirred for another 10 min. The mixture was subjected to a defoaming treatment under reduced pressure to obtain a negative electrode slurry having excellent fluidity.

The negative electrode slurry was applied onto a copper foil as the current collector having a thickness of 20 μm by using a comma coater so as to have a layer thickness after drying of about 150 μm, and then the coated material was dried. The drying step was performed by conveying the copper foil through an oven at 60° C. for 2 minutes at a speed of 0.5 m/min. The dried slurry was then heated at 120° C. for 2 min to obtain a master roll for negative electrode. The master roll for negative electrode was rolled by a roll press to obtain a negative electrode having a negative electrode active material layer of 80 μm thickness.

1.10. Method for Producing Lithium Ion Secondary Battery

The positive electrode obtained in the aforementioned step [1.8] was cut out in 40 mm width×40 mm length to obtain a positive electrode having a square shape. The negative electrode obtained in the aforementioned step [1.9] was cut out in 42 mm width×42 mm length to obtain a negative electrode having a square shape. Further the separator obtained in the aforementioned step [1.7] was prepared, and the separator was cut out in 46 mm width×46 mm length to obtain a separator having a square shape.

On a positive electrode active material layer-side surface of the positive electrode having a square shape, the separator having a square shape was disposed. Further, the negative electrode having a square shape was disposed on the separator in such manner that a negative electrode active material layer-side surface is opposed to the separator. In this manner, a stacked body having the positive electrode, the separator, and the negative electrode in this order was obtained.

The stacked body was disposed in an aluminum exterior package. An electrolytic solution was poured into the aluminum exterior package with no air remaining inside. Further, heat sealing was performed at 150° C. for sealing the opening of the aluminum exterior package, to thereby produce a laminate-type lithium ion secondary battery. As the electrolytic solution, a solution prepared by adding 2 vol. % of vinylene carbonate (VC) to an 1.0M solution of $LiPF_6$ was used. As the solvent of the $LiPF_6$ solution, a mixed solvent of ethylene carbonate (EC) and diethyl carbonate (DEC) at a volume ratio of EC/DEC=1/2 was used.

Using the lithium ion secondary battery thus produced, the high temperature cycle property was evaluated in the aforementioned manner.

Example 2

In the aforementioned step [1.5], the level of the energy applied for dispersing the dispersion of the non-conductive particles was changed to 6 Wh/kg.

Other than this matter, a lithium ion secondary battery was produced and evaluated in the same manner as in Example 1.

Example 3

An aqueous dispersion of particulate polymer B was produced in the same manner as in the step [1.2] of Example 1, except that the amount of acrylonitrile was changed to 19.85 parts, 77.95 parts of 2-ethylhexyl acrylate was used in place of butyl acrylate as the (meth)acrylic ester monomer, allyl glycidyl ether was not used, and 0.2 parts of allyl methacrylate was used in place of N-methylolacrylamide.

In the aforementioned step [1.6], this aqueous dispersion of particulate polymer B was used in place of the aqueous dispersion of particulate polymer A. Other than this matter, a lithium ion secondary battery was produced and evaluated in the same manner as in Example 1.

Example 4

An aqueous dispersion of particulate polymer C was produced in the same manner as in the step [1.2] of Example 1, except that the amount of acrylonitrile was changed to 20 parts, the amount of butyl acrylate was changed to 73.8 parts, and the amount of methacrylic acid was changed to 4 parts.

In the aforementioned step [1.6], this aqueous dispersion of particulate polymer C was used in place of the aqueous dispersion of particulate polymer A. Other than this matter, a lithium ion secondary battery was produced and evaluated in the same manner as in Example 1.

Example 5

In the aforementioned step [1.4], 10 wt % aqueous solution of polycarboxylic acid polymer ("SB Dispersant 5020" manufactured by San Nopco Ltd.) was used in place of the aqueous dispersion of water-soluble polymer A. Other than this matter, a lithium ion secondary battery was produced and evaluated in the same manner as in Example 1.

Example 6

To a four-necked flask having internal volume of 1 L equipped with a reflux condenser, 142 g of pure water was charged, and while stirring the water at 90° C., 600 g of 30% aqueous solution of sodium acrylate, 38 g of 60% aqueous solution of sodium 3-allyloxy-2-hydroxypropanesulfonate, and 200 g of 3% aqueous solution of ammonium persulfate were each added dropwise to the water over 3.5 hours to perform a copolymerization reaction. An aqueous solution of water-soluble polymer B was thus obtained. The amount of unreacted monomers was measured with a bromine addition method and a polarographic method. As a result, it was found out that the polymerization rate was 96%. The number average molecular weight of the water-soluble polymer B measured by the gel permeation chromatography was 6,000.

In the aforementioned step [1.4], this aqueous solution of water-soluble polymer B was used in place of the water-soluble polymer A. Other than this matter, a lithium ion secondary battery was produced and evaluated in the same manner as in Example 1.

Example 7

To a reaction vessel equipped with a stirrer, 70 parts of ion exchange water, 0.15 parts of sodium lauryl sulfate ("EMAL 2F" manufactured by Kao Chemicals) as an emulsifier, and 0.5 parts of ammonium persulfate were each supplied, and a gas phase portion was replaced with a nitrogen gas. Then the mixture was heated to 60° C.

In the meantime, in another vessel, 50 parts of ion exchange water, 0.5 parts of sodium dodecylbenzene sulfonate, and as polymerizable monomers 35 parts of ethyl acrylate, 34.2 parts of butyl acrylate, 30 parts of methacrylic acid, and 0.8 parts of etyleneglycol dimethacrylate ester, as well as 0.15 parts of a chelate agent ("CHELEST400G" manufactured by CHELEST Corp.) were mixed to obtain a monomer mixture. This monomer mixture was continuously added to the reaction vessel over 4 hours to perform polymerization. During the addition, the reaction was performed at 60° C. After the completion of the addition, the reaction mixture was stirred for another 3 hours at 70° C., and then the reaction was terminated. As a result, an aqueous dispersion of particulate polymer was produced. To this aqueous dispersion, an aqueous solution of sodium hydroxide was added to adjust pH to 8, thereby dissolving the particulate polymer in water. Consequently, an aqueous solution of water-soluble polymer C was obtained.

In the aforementioned step [1.4], this aqueous solution of water-soluble polymer C was used in place of the water-soluble polymer A. Other than this matter, a lithium ion secondary battery was produced and evaluated in the same manner as in Example 1.

Example 8

In the aforementioned step [1.4], the amount of the aqueous solution of water-soluble polymer A was changed to 2 parts in terms of the amount of the water-soluble polymer A. Other than this matter, a lithium ion secondary battery was produced and evaluated in the same manner as in Example 1.

Example 9

An aqueous solution of water-soluble polymer D was obtained in the same manner as in the aforementioned step [1.3] except that the amount of the 30% aqueous solution of sodium persulfate was changed to 1.0 part in terms of the amount of sodium persulfate. The weight average molecular weight of the water-soluble polymer obtained was 12,000.

In the aforementioned step [1.4], this aqueous solution of water-soluble polymer D was used in place of the water-soluble polymer A. Other than this matter, a lithium ion secondary battery was produced and evaluated in the same manner as in Example 1.

Example 10

In the aforementioned step [1.4], the α-alumina particles were mixed after the α-alumina particles were classified.
Other than this matter, a lithium ion secondary battery was produced and evaluated in the same manner as in Example 1.

Example 11

In the aforementioned step [1.4], water having an electrical conductivity of 100 µS/cm was used in place of the water having an electrical conductivity of 10 µS/cm.
Other than this matter, a lithium ion secondary battery was produced and evaluated in the same manner as in Example 1.

Example 12

An aqueous dispersion of particulate polymer D was produced in the same manner as in the step [1.2] of Example 1, except that butyl acrylate, acrylonitrile, allyl glycidyl ether, and N-methylolacrylamide were not used, and in place thereof 46.7 parts of styrene, 49.5 parts of butadiene, and 0.5 parts of acrylic acid were used, and the amount of methacrylic acid was changed to 3.3 parts.
In the aforementioned step [1.6], this aqueous dispersion of particulate polymer D was used in place of the aqueous dispersion of particulate polymer A. Other than this matter, a lithium ion secondary battery was produced and evaluated in the same manner as in Example 1.

Example 13

In the aforementioned step [1.4], barium sulfate (primary particle diameter: 0.5 µm, specific surface area: 3.5 g/m²) was used in place of the α-alumina particles.
Other than this matter, a lithium ion secondary battery was produced and evaluated in the same manner as in Example 1.

Example 14

In the aforementioned step [1.4], barium sulfate (primary particle diameter: 0.6 µm, specific surface area: 3.0 g/m²) was used in place of the α-alumina particles.
Other than this matter, a lithium ion secondary battery was produced and evaluated in the same manner as in Example 1.

Comparative Example 1

In the aforementioned step [1.5], the level of the energy applied for dispersing the dispersion of the non-conductive particles was changed to 1 Wh/kg.
Other than this matter, a lithium ion secondary battery was produced and evaluated in the same manner as in Example 1.

Comparative Example 2

In the aforementioned step [1.5], the level of the energy applied for dispersing the dispersion of the non-conductive particles was changed to 9 Wh/kg.
Other than this matter, a lithium ion secondary battery was produced and evaluated in the same manner as in Example 1.

Comparative Example 3

In the aforementioned step [1.4], 10 wt % aqueous solution of polyvinyl alcohol ("PVA102" manufactured by K.K. Kuraray) was used as a polymer having no acidic group in place of the aqueous solution of water-soluble polymer A. Other than this matter, a lithium ion secondary battery was produced and evaluated in the same manner as in Example 1.

RESULTS

The results of Examples and Comparative Examples are shown in Tables 1 to 4. The meanings of the abbreviations in the tables are as follows.
Monomer I: Nitrile group-containing monomer
Monomer II: (Meth)acrylate monomer
Monomer III: Ethylenically unsaturated acid monomer
Monomer IV: Crosslinkable monomer
BA: Butyl acrylate
2EHA: 2-Ethylhexyl acrylate
MAA: Methacrylic acid
NMA: N-Methylol acrylamide
AMA: Allyl(meth)acrylate
AGE: Allylglycidyl ether
PCA: Polycarboxylic acid polymer
PVA: Polyvinyl alcohol
Ratio of acid components: Weight ratio of sulfonic acid/carboxylic acid in water-soluble polymer
Mw: Weight average molecular weight
CMC: Carboxymethyl cellulose
PO: Propylene oxide
EO: Ethylene oxide
Electrical conductivity: Electrical conductivity of water mixed with non-conductive particles and water-soluble polymer
Solid content concentration of dispersion: Solid content concentration of dispersion of non-conductive particles
Dispersion condition: Level of energy applied for dispersing dispersion of non-conductive particles
Iron ion concentration: Iron ion concentration in porous membrane slurry

TABLE 1

Results of Examples 1 to 4

| | Ex. 1 | Ex. 2 | Ex. 3 | Ex. 4 |
|---|---|---|---|---|
| Non-conductive particles | | | | |
| Amount (parts) | 100 | 100 | 100 | 100 |
| BET specific surface area (m²/g) | 5.5 | 7.8 | 5.5 | 5.5 |
| D10 (µm) | 0.39 | 0.33 | 0.39 | 0.39 |
| D50 (µm) | 0.87 | 0.71 | 0.87 | 0.87 |
| D90 (µm) | 1.38 | 1.25 | 1.38 | 1.38 |
| Aspect ratio | 1.2 | 1.2 | 1.2 | 1.2 |

TABLE 1-continued

Results of Examples 1 to 4

| | Ex. 1 | Ex. 2 | Ex. 3 | Ex. 4 |
|---|---|---|---|---|
| Type of particulate polymer | A | A | B | C |
| Amount of particulate polymer (parts) | 6 | 6 | 6 | 6 |
| Amount of monomer I (parts) | 2 | 2 | 19.85 | 20 |
| Type of monomer II | BA | BA | 2EHA | BA |
| Amount of monomer II (parts) | 93.8 | 93.8 | 77.95 | 73.8 |
| Type of monomer III | MAA | MAA | MAA | MAA |
| Amount of monomer III (parts) | 2 | 2 | 2 | 4 |
| Type of monomer IV | AGE/NMA | AGE/NMA | AMA | AGE/NMA |
| Amount of monomer IV (parts) | 1/1.2 | 1/1.2 | 0.2 | 1/1.2 |
| Type of water-soluble polymer | A | A | A | A |
| Amount of water-soluble polymer (parts) | 0.5 | 0.5 | 0.5 | 0.5 |
| Ratio of acid components | 0.25 | 0.25 | 0.25 | 0.25 |
| Mw of water-soluble polymer | 6000 | 6000 | 6000 | 6000 |
| Type of thickener | CMC | CMC | CMC | CMC |
| Amount of thickener (parts) | 1.5 | 1.5 | 1.5 | 1.5 |
| Ratio of thickener/water-soluble polymer | 3 | 3 | 3 | 3 |
| Type of surfactant | PO/EO = 50/50 | PO/EO = 50/50 | PO/EO = 50/50 | PO/EO = 50/50 |
| Amount of surfactant (parts) | 0.5 | 0.5 | 0.5 | 0.5 |
| Electrical conductivity (μS/cm) * | 10 | 10 | 10 | 10 |
| Solid content concentration of dispersion (wt %) | 50 | 50 | 50 | 50 |
| Dispersion condition (Wh/kq) | 5.4 | 6 | 5.4 | 5.4 |
| Solid content concentration of slurry (wt %) | 40 | 40 | 40 | 40 |
| Iron ion concentration (ppm) | 18 | 18 | 18 | 18 |
| Water content of separator | A | A | A | A |
| Powder falling property | A | B | B | A |
| Dispersibility | A | A | A | A |
| High temperature cycle property | A | A | A | B |

* Electrical conductivity: Electrical conductivity of water mixed with non-conductive particles and water-soluble polymer.

TABLE 2

Results of Examples 5 to 8

| | Ex. 5 | Ex. 6 | Ex. 7 | Ex. 8 |
|---|---|---|---|---|
| Non-conductive particles | | | | |
| Amount (parts) | 100 | 100 | 100 | 100 |
| BET specific surface area (m²/g) | 5.5 | 5.5 | 5.5 | 5.5 |
| D10 (μm) | 0.39 | 0.39 | 0.39 | 0.39 |
| D50 (μm) | 0.87 | 0.87 | 0.87 | 0.87 |
| D90 (μm) | 1.38 | 1.38 | 1.38 | 1.38 |
| Aspect ratio | 1.2 | 1.2 | 1.2 | 1.2 |
| Type of particulate polymer | A | A | A | A |
| Amount of particulate polymer (parts) | 6 | 6 | 6 | 6 |
| Amount of monomer I (parts) | 2 | 2 | 2 | 2 |
| Type of monomer II | BA | BA | BA | BA |
| Amount of monomer II (parts) | 93.8 | 93.8 | 93.8 | 93.8 |
| Type of monomer III | MAA | MAA | MAA | MAA |
| Amount of monomer III (parts) | 2 | 2 | 2 | 2 |
| Type of monomer IV | AGE/NMA | AGE/NMA | AGE/NMA | AGE/NMA |
| Amount of monomer IV (parts) | 1/1.2 | 1/1.2 | 1/1.2 | 1/1.2 |
| Type of water-soluble polymer | PCA | B | C | A |
| Amount of water-soluble polymer (parts) | 0.5 | 0.5 | 0.5 | 2 |
| Ratio of acid components | — | 0.13 | — | 0.25 |
| Mw of water-soluble polymer | 6000 | 6000 | 6000 | 6000 |
| Type of thickener | CMC | CMC | CMC | CMC |
| Amount of thickener (parts) | 1.5 | 1.5 | 1.5 | 1.5 |
| Ratio of thickener/water-soluble polymer | 3 | 3 | 3 | 3 |
| Type of surfactant | PO/EO = 50/50 | PO/EO = 50/50 | PO/EO = 50/50 | PO/EO = 50/50 |
| Amount of surfactant (parts) | 0.5 | 0.5 | 0.5 | 0.5 |
| Electrical conductivity (μS/cm) * | 10 | 10 | 10 | 10 |

TABLE 2-continued

| Results of Examples 5 to 8 | | | | |
|---|---|---|---|---|
| | Ex. 5 | Ex. 6 | Ex. 7 | Ex. 8 |
| Solid content concentration of dispersion (wt %) | 50 | 50 | 50 | 50 |
| Dispersion condition (Wh/kq) | 5.4 | 5.4 | 5.4 | 5.4 |
| Solid content concentration of slurry (wt %) | 40 | 40 | 40 | 40 |
| Iron ion concentration (ppm) | 18 | 18 | 18 | 18 |
| Water content of separator | C | B | A | B |
| Powder falling property | A | A | A | A |
| Dispersibility | A | A | B | A |
| High temperature cycle property | B | A | A | A |

\* Electrical conductivity: Electrical conductivity of water mixed with non-conductive particles and water-soluble polymer.

TABLE 3

| Results of Examples 9 to 12 | | | | |
|---|---|---|---|---|
| | Ex. 9 | Ex. 10 | Ex. 11 | Ex. 12 |
| Non-conductive particles | | | | |
| Amount (parts) | 100 | 100 | 100 | 100 |
| BET specific surface area ($m^2/g$) | 5.5 | 10 | 5.5 | 5.5 |
| D10 (μm) | 0.39 | 0.31 | 0.39 | 0.39 |
| D50 (μm) | 0.87 | 0.72 | 0.87 | 0.87 |
| D90 (μm) | 1.38 | 1.01 | 1.38 | 1.38 |
| Aspect ratio | 1.2 | 1.2 | 1.2 | 1.2 |
| Type of particulate polymer | A | A | A | D |
| Amount of particulate polymer (parts) | 6 | 6 | 6 | 6 |
| Amount of monomer I (parts) | 2 | 2 | 2 | — |
| Type of monomer II | BA | BA | BA | — |
| Amount of monomer II (parts) | 93.8 | 93.8 | 93.8 | — |
| Type of monomer III | MAA | MAA | MAA | MAA |
| Amount of monomer III (parts) | 2 | 2 | 2 | 3.3 |
| Type of monomer IV | AGE/NMA | AGE/NMA | AGE/NMA | — |
| Amount of monomer IV (parts) | 1/1.2 | 1/1.2 | 1/1.2 | — |
| Type of water-soluble polymer | D | A | A | A |
| Amount of water-soluble polymer (parts) | 0.5 | 0.5 | 0.5 | 0.5 |
| Ratio of acid components | 0.25 | 0.25 | 0.25 | 0.25 |
| Mw of water-soluble polymer | 12000 | 6000 | 6000 | 6000 |
| Type of thickener | CMC | CMC | CMC | CMC |
| Amount of thickener (parts) | 1.5 | 1.5 | 1.5 | 1.5 |
| Ratio of thickener/water-soluble polymer | 3 | 3 | 3 | 3 |
| Type of surfactant | PO/EO = 50/50 | PO/EO = 50/50 | PO/EO = 50/50 | PO/EO = 50/50 |
| Amount of surfactant (parts) | 0.5 | 0.5 | 0.5 | 0.5 |
| Electrical conductivity (μS/cm) * | 10 | 10 | 100 | 10 |
| Solid content concentration of dispersion (wt %) | 50 | 50 | 50 | 50 |
| Dispersion condition (Wh/kq) | 5.4 | 5.4 | 5.4 | 5.4 |
| Solid content concentration of slurry (wt %) | 40 | 40 | 40 | 40 |
| Iron ion concentration (ppm) | 18 | 18 | 800 | 18 |
| Water content of separator | A | C | B | B |
| Powder falling property | A | B | B | D |
| Dispersibility | B | B | B | B |
| High temperature cycle property | A | A | C | B |

\* Electrical conductivity: Electrical conductivity of water mixed with non-conductive particles and water-soluble polymer.

TABLE 4

Results of Examples 13 and 14

| | Ex. 13 | Ex. 14 |
|---|---|---|
| Non-conductive particles | | |
| Amount (parts) | 100 | 100 |
| BET specific surface area (m$^2$/g) | 5.8 | 8.5 |
| D10 (μm) | 0.38 | 0.32 |
| D50 (μm) | 0.88 | 0.72 |
| D90 (μm) | 1.41 | 1.22 |
| Aspect ratio | 1.3 | 1.3 |
| Type of particulate polymer | A | A |
| Amount of particulate polymer (parts) | 6 | 6 |
| Amount of monomer I (parts) | 2 | 2 |
| Type of monomer II | BA | BA |
| Amount of monomer II (parts) | 93.8 | 93.8 |
| Type of monomer III | MAA | MAA |
| Amount of monomer III (parts) | 2 | 2 |
| Type of monomer IV | AGE/NMA | AGE/NMA |
| Amount of monomer IV (parts) | 1/1.2 | 1/1.2 |
| Type of water-soluble polymer | A | A |
| Amount of water-soluble polymer (parts) | 0.5 | 0.5 |
| Ratio of acid components | 0.25 | 0.25 |
| Mw of water-soluble polymer | 6000 | 6000 |
| Type of thickener | CMC | CMC |
| Amount of thickener (parts) | 1.5 | 1.5 |
| Ratio of thickener/water-soluble polymer | 3 | 3 |
| Type of surfactant | PO/EO = 50/50 | PO/EO = 50/50 |
| Amount of surfactant (parts) | 0.5 | 0.5 |
| Electrical conductivity (μS/cm) * | 10 | 10 |
| Solid content concentration of dispersion (wt %) | 50 | 50 |
| Dispersion condition (Wh/kq) | 5.4 | 5.4 |
| Solid content concentration of slurry (wt %) | 40 | 40 |
| Iron ion concentration (ppm) | 18 | 18 |
| Water content of separator | A | A |
| Powder falling property | A | A |
| Dispersibility | A | A |
| High temperature cycle property | A | A |

* Electrical conductivity: Electrical conductivity of water mixed with non-conductive particles and water-soluble polymer.

TABLE 5

Results of Comparative Examples 1 to 3

| | Comp. Ex. 1 | Comp. Ex. 2 | Comp. Ex. 3 |
|---|---|---|---|
| Non-conductive particles | | | |
| Amount (parts) | 100 | 100 | 100 |
| BET specific surface area (m$^2$/g) | 4.8 | 11 | 5.5 |
| D10 (μm) | 0.39 | 0.39 | 0.39 |
| D50 (μm) | 0.87 | 0.87 | 0.87 |
| D90 (μm) | 1.38 | 1.38 | 1.38 |
| Aspect ratio | 1.2 | 1.2 | 1.2 |
| Type of particulate polymer | A | A | A |
| Amount of particulate polymer (parts) | 6 | 6 | 6 |
| Amount of monomer I (parts) | 2 | 2 | 2 |
| Type of monomer II | BA | BA | BA |
| Amount of monomer II (parts) | 93.8 | 93.8 | 93.8 |
| Type of monomer III | MAA | MAA | MAA |
| Amount of monomer III (parts) | 2 | 2 | 2 |
| Type of monomer IV | AGE/NMA | AGE/NMA | AGE/NMA |
| Amount of monomer IV (parts) | 1/1.2 | 1/1.2 | 1/1.2 |
| Type of water-soluble polymer | A | A | PVA |
| Amount of water-soluble polymer (parts) | 0.5 | 0.5 | 0.5 |
| Ratio of acid components | 0.25 | 0.25 | — |
| Mw of water-soluble polymer | 6000 | 6000 | 6000 |
| Type of thickener | CMC | CMC | CMC |
| Amount of thickener (parts) | 1.5 | 1.5 | 1.5 |
| Ratio of thickener/water-soluble polymer | 3 | 3 | 3 |
| Type of surfactant | PO/EO = 50/50 | PO/EO = 50/50 | PO/EO = 50/50 |
| Amount of surfactant (parts) | 0.5 | 0.5 | 0.5 |
| Electrical conductivity (μS/cm) * | 10 | 10 | 10 |
| Solid content concentration of dispersion (wt %) | 50 | 50 | 50 |
| Dispersion condition (Wh/kq) | 1 | 9 | 5.4 |
| Solid content concentration of slurry (wt %) | 40 | 40 | 40 |
| Iron ion concentration (ppm) | 18 | 18 | 18 |
| Water content of separator | A | D | B |
| Powder falling property | D | C | C |
| Dispersibility | D | D | D |
| High temperature cycle property | C | D | D |

* Electrical conductivity: Electrical conductivity of water mixed with non-conductive particles and water-soluble polymer.

DISCUSSION

In Examples, all of the lithium ion secondary batteries obtained had excellent high temperature cycle property.

Further, in Examples, all of the non-conductive particles had excellent dispersibility. Thus, it was confirmed that the porous membrane can be densely filled with the non-conductive particles, and thereby the heat resistance and the mechanical strength of the porous membrane can be enhanced and safety of the lithium ion secondary battery can be improved.

Further, since the non-conductive particles have high dispersibility, the non-conductive particles can be prevented from being aggregated into large particles in the porous membrane, thereby making it possible to prevent the occurrence of the short circuit caused by the large particles breaking through the organic separator layer.

The invention claimed is:

1. A slurry for a lithium ion secondary battery porous membrane, comprising non-conductive particles, a water-soluble polymer containing 80% by weight or more of acidic group-containing monomer units, a particulate polymer, and a chelate agent, wherein:
    an amount of the water-soluble polymer is 0.05 parts by weight to 2 parts by weight relative to 100 parts by weight of the non-conductive particles,
    a BET specific surface area of the non-conductive particles is 5 m$^2$/g to 10 m$^2$/g,
    an aspect ratio of the non-conductive particles is 1 or more and 3 or less,
    the acidic group-containing monomer units include:
        one or more monomer units having a —COOH group; and
        one or more monomer units having a —SO$_3$H group,
    a weight ratio of the one or more monomer units having a —SO$_3$H group to the one or more monomer units having a —COOH group is 1/999 or more and 0.3 or less, and
    a material of the non-conductive particles is at least one selected from the group consisting of barium sulfate, aluminum oxide, and aluminum oxide hydrate.

2. The slurry for a lithium ion secondary battery porous membrane according to claim 1, wherein, in an accumulated particle size distribution of the non-conductive particles, a particle diameter D10 that is a cumulative volume of particle of 10% from a small diameter side, a particle diameter D50 that is a cumulative volume of particle of 50% from the small diameter side, and a particle diameter D90 that is a cumulative volume of particle of 90% from the small diameter side are as follows:

D10 is 0.2 μm to 0.4 μm;
D50 is 0.5 μm to 0.9 μm; and
D90 is 1.0 μm to 3.0 μm.

3. The slurry for a lithium ion secondary battery porous membrane according to claim 1 having an iron ion concentration of 5 ppm to 500 ppm.

4. The slurry for a lithium ion secondary battery porous membrane according to claim 1, wherein the particulate polymer is a particulate acrylic polymer.

5. The slurry for a lithium ion secondary battery porous membrane according to claim 1 having a solid content concentration of 35% by weight to 50% by weight.

6. A method for producing the slurry for a lithium ion secondary battery porous membrane according to claim 1, comprising the steps of:

mixing the non-conductive particles, the water-soluble polymer containing 60% by weight or more of the acidic group-containing monomer unit, and water having an electrical conductivity of 0.5 μS/cm to 30 μS/cm to obtain a dispersion of the non-conductive particles having a solid content concentration of 40% by weight to 60% by weight;

dispersing the dispersion of the non-conductive particles under a condition of 2 Wh/kg to 8 Wh/kg; and mixing the dispersion of the non-conductive particles with the particulate polymer.

7. A separator for a lithium ion secondary battery, comprising: an organic separator layer; and a porous membrane obtained by applying onto the organic separator layer the slurry for a lithium ion secondary battery porous membrane according to claim 1 and drying the slurry.

8. A lithium ion secondary battery comprising: a positive electrode, a negative electrode, the separator for a lithium ion secondary battery according to claim 7, and an electrolytic solution.

* * * * *